US012775239B2

(12) United States Patent
Imboden et al.

(10) Patent No.: US 12,775,239 B2
(45) Date of Patent: Oct. 27, 2026

(54) TIMEPIECE PROVIDED WITH A MECHANICAL MOVEMENT AND A DEVICE FOR CORRECTING A DISPLAYED TIME

(71) Applicant: The Swatch Group Research and Development Ltd, Marin (CH)

(72) Inventors: Matthias Imboden, St-Blaise (CH); Gérard Surmely, Villars-Epeney (CH); Lionel Tombez, Bevaix (CH)

(73) Assignee: The Swatch Group Research and Development Ltd, Marin (CH)

( * ) Notice: Subject to any disclaimer, the term of this patent is extended or adjusted under 35 U.S.C. 154(b) by 1148 days.

(21) Appl. No.: 17/785,855

(22) PCT Filed: Oct. 13, 2020

(86) PCT No.: PCT/EP2020/078750
§ 371 (c)(1),
(2) Date: Jun. 15, 2022

(87) PCT Pub. No.: WO2021/121711
PCT Pub. Date: Jun. 24, 2021

(65) Prior Publication Data

US 2023/0009341 A1 Jan. 12, 2023

(30) Foreign Application Priority Data

Dec. 17, 2019 (EP) .................................... 19217160
Dec. 23, 2019 (EP) .................................... 19219544

(51) Int. Cl.
*G04B 17/06* (2006.01)
*G04B 27/00* (2006.01)
(Continued)

(52) U.S. Cl.
CPC ......... *G04B 17/063* (2013.01); *G04B 27/007* (2013.01); *G04C 3/042* (2013.01); *G04C 3/047* (2013.01); *G04C 11/08* (2013.01)

(58) Field of Classification Search
CPC .... G04B 17/063; G04B 27/007; G04C 3/042; G04C 3/047; G04C 11/08
(Continued)

(56) References Cited

U.S. PATENT DOCUMENTS

2010/0128573 A1 * 5/2010 Meijer ..................... G04C 3/06 368/208
2018/0181073 A1 6/2018 Tombez et al.
(Continued)

FOREIGN PATENT DOCUMENTS

CH 713332 A2 * 6/2018 ............. G04C 10/00
CH 713637 A2 * 9/2018 ............. G04C 10/02
(Continued)

OTHER PUBLICATIONS

Tombez (CH-713637-A2) Machine Translation from PE2E Search. (Year: 2018).*
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A watch is formed by a mechanical movement incorporating a mechanical resonator. The watch comprises a display displaying the time and a correction device for correcting the displayed time, which is formed by a receiver for receiving an external correction signal which is supplied by an external electronic device (in particular a mobile phone), a braking device for braking the mechanical resonator and an electronic controller. The correction device is arranged such
(Continued)

that it can correct the time displayed as a function of a time error (loss or gain) contained in the external correction signal. For this purpose, the correction device is arranged such that the braking device can act on the mechanical resonator during a correction period to vary the running of the drive mechanism of the display, in order to correct at least for the most part the time error in the time displayed.

23 Claims, 15 Drawing Sheets

(51) Int. Cl.
*G04C 3/04* (2006.01)
*G04C 11/08* (2006.01)

(58) Field of Classification Search
USPC .......................................................... 368/169
See application file for complete search history.

(56) References Cited

U.S. PATENT DOCUMENTS

| | | | |
|---|---|---|---|
| 2020/0285199 | A1 | 9/2020 | Tombez |
| 2020/0379411 | A1 | 12/2020 | Watanabe et al. |

FOREIGN PATENT DOCUMENTS

| | | | | | |
|---|---|---|---|---|---|
| CN | 109946949 | A | | 6/2019 | |
| EP | 3 309 630 | A1 | | 4/2018 | |
| EP | 3 339 982 | A1 | | 6/2018 | |
| JP | 2018-105852 | A | | 7/2018 | |
| WO | WO 2018/177779 | A1 | | 10/2018 | |
| WO | WO 2018/181467 | A1 | | 10/2018 | |
| WO | WO-2018177774 | A1 | * | 10/2018 | ............. G04B 15/14 |

OTHER PUBLICATIONS

CH 713332 A2 Machine Translation from PE2E Search (Year: 2018).*

Combined Chinese Office Action and Search Report issued on Jun. 14, 2024 in Chinese Patent Application No. 202080087773.1 (with English translation of category of cited documents), 9 pages.

International Search Report mailed on Nov. 25, 2020 in PCT/EP2020/078750 filed on Oct. 13, 2020 (2 pages).

Notice of the Reason for Refusal issued Aug. 1, 2023 in Japanese Patent Application No. 2022-537398 (with English language translation), 14 pages.

* cited by examiner

TIMEPIECE PROVIDED WITH A MECHANICAL MOVEMENT AND A DEVICE FOR CORRECTING A DISPLAYED TIME

TECHNICAL FIELD

The present invention relates, in general, to a timepiece comprising a mechanical movement, a display for displaying an actual time, which is driven by this mechanical movement, and a device for correcting this actual time.

TECHNOLOGICAL BACKGROUND

In the field of mechanical watches, the conventional manner for correcting the actual time indicated by the display thereof is to use the conventional stem-crown which is generally arranged to act, in the protruding position, on a wheel set for driving the hours indicator and the minutes indicator, thanks to friction provided in the kinematic chain between these indicators and the escape wheel. Thus, in order to set a mechanical watch to the actual time, the user or a robot must generally pull out the stem-crown and actuate same such that it rotates to bring the hours and minutes indicators into the desired respective positions, in particular by visual comparison with a reference clock, as can be found, for example, in train stations, or with a digital time provided, for example, by a computer.

SUMMARY OF THE INVENTION

It can thus be seen that, in the field of timepieces provided with a mechanical movement, in addition to ensuring precise running of this mechanical movement, there is a real need for an effective system for correcting the actual time displayed by these timepieces comprising a mechanical movement. In particular, the purpose of the present invention is to be able to precisely set the hands of a timepiece comprising a mechanical movement which drives a time display, preferably to be able to set the hands substantially to the precise actual time given by an external system arranged to provide same (in particular a system connected to an atomic clock), without requiring a user or a robot to actuate a stem-crown or other external control member of the timepiece to personally carry out the hand-setting operation on the display. Within the scope of the invention, the precision of the setting of a timepiece provided with a mechanical movement to the actual time does not depend on a visual assessment by the user required to estimate when the various indicators concerned are in correct respective positions.

The term ‘actual time’ is understood to mean the legal time of a given location generally in which the timepiece and the user thereof are located. The actual time is generally displayed in hours, in minutes and optionally in seconds. The actual time can be indicated with a certain error by a timepiece, in particular a timepiece of the mechanical type. In order to indicate the legal time given with high precision in particular by/via a GPS system, a telephone network or a computer in particular connected to an Internet network server receiving the actual time from a high-precision clock, the expression ‘precise actual time’ will be used herein. This expression further applies to the actual time correctly given by an electronic clock or an electronic time base, incorporated into a device that is external to the timepiece, which can be regularly synchronised with a high-precision clock giving the legal time. In this text, the actual time will be simply referred to as the ‘time’, in particular with regard to the actual time displayed by a timepiece.

In order to satisfy the aforementioned needs which have been present in the horological field for many years, the present invention proposes a timepiece comprising:

- a display displaying the actual time;
- a mechanical movement formed by a mechanism for driving the display and by a mechanical resonator which is coupled to the drive mechanism such that the oscillation thereof times the running of this drive mechanism;
- a device for correcting the actual time indicated by the display;

and wherein the device for correcting the actual time displayed, incorporated into the aforementioned timepiece, is formed by: —a receiver for receiving an external correction signal for the actual time displayed, —an electronic control unit, and—a device for braking the mechanical resonator; the electronic control unit being arranged to be able to process the information contained in the external correction signal and to control the braking device as a function of this information. Moreover, the device for correcting the actual time displayed is arranged such that, when the external correction signal received by the timepiece requires the actual time displayed to be corrected, the braking device can act on the mechanical resonator during a correction period, to vary the running of the drive mechanism, so as to carry out at least the major part of the correction to the actual time displayed, preferably substantially all of this required correction.

The term ‘braking device’ is understood to mean, in general, any device capable of braking and/or halting an oscillating mechanical resonator and/or momentarily keeping such a resonator at a halt (i.e. blocking same). The braking device can be formed by one or more braking units (one or more actuators). In the case where the braking device is formed by a plurality of braking units, in particular two braking units, each braking unit is selected to act on the mechanical resonator in a specific situation relative to the required correction, in particular a first braking unit to correct a loss and a second braking unit to correct a gain (the second braking unit being advantageously arranged such that it can halt and momentarily block the resonator). The phrase ‘time the running of a drive mechanism of a display’ is understood to mean setting the pace of the motion of wheel sets of this mechanism when in operation, in particular determining the rotational speeds of these wheel sets and thus of at least one indicator of the display. In the description below, when the term ‘resonator’ is used without any specific qualifier, it denotes a mechanical resonator. An oscillating resonator is used to describe a resonator that is considered to be in its activated state, wherein it oscillates and is sustained, via an escapement, by a mechanical energy source.

In a preferred embodiment, the braking device is formed by an electromechanical actuator, arranged such that it can apply braking pulses to the mechanical resonator, and the electronic control unit comprises a device for generating at least one frequency which is arranged such that it can generate a first periodic digital signal at a frequency $F_{SUP}$. The electronic control unit is arranged to supply, to the braking device, whenever the external correction signal received via the receiver unit corresponds to a loss in the time displayed that is to be corrected, a first control signal derived from the first periodic digital signal, during a first correction period, to activate the braking device such that this braking device generates a first series of periodic braking pulses that are applied to the mechanical resonator at said frequency $F_{SUP}$, the number of periodic braking pulses in said first series and thus the duration of the correction period being determined by the loss to be corrected. The frequency $F_{SUP}$ is provided and the braking device is arranged such that said first series of periodic braking pulses at the frequency $F_{SUP}$ can, during the first correction period, result in a first synchronous phase wherein the oscillation of the mechanical resonator is synchronised (on average) to a correction frequency $FS_{Cor}$ which is greater than a setpoint frequency F0c provided for the mechanical resonator.

According to a preferred alternative embodiment, wherein the horological movement comprises an escapement associated with the resonator, the frequency $F_{SUP}$ and the duration of the braking pulses of the first series of periodic braking pulses are selected such that, during said first synchronous phase, each of the braking pulses of said first series occurs outside a coupling zone of the oscillating resonator with the escapement.

In one specific embodiment, the timepiece comprises a device for blocking the mechanical resonator. Furthermore, the electronic control unit is arranged such that it can provide the blocking device, when the external correction signal received via the receiver unit corresponds to a displayed time gain that is to be corrected, with a control signal which activates the blocking device such that it blocks the oscillation of the mechanical resonator during a correction period determined by the gain to be corrected, so as to stop the running of the drive mechanism during this correction period. The blocking/correction period normally has a duration that is substantially equal to the corresponding gain to be corrected.

In general, the correction of the time displayed by the display is relative to an error detected in this displayed time by an external electronic device arranged to be able to supply the external correction signal to the timepiece. In one specific case, the correction of the displayed time is relative to a seasonal time change or even to a time zone change.

The invention further relates to an assembly formed by a timepiece according to the invention and an external device comprising a transmitter for transmitting said external correction signal. The external device comprises:

- a photographic device comprising a photographic sensor formed by an array of photodetectors,
- an image processing algorithm which is arranged to be able to determine the position of at least one determined hand of the display of the timepiece in an image captured by the photographic device, and
- a time base capable of supplying the precise actual time.

In a preferred embodiment, the external device further comprises an algorithm for calculating a time error between a first time datum, displayed by the display at a given moment in time and detected by the external device via the photographic sensor thereof and the image processing algorithm thereof, and a second time datum corresponding to the first time datum and supplied substantially at said given moment in time by the time base. When it is intended to correct the calculated time error, the external correction signal supplied by the device external to the timepiece comprises information regarding this time error.

BRIEF DESCRIPTION OF THE FIGURES

The invention will be described in more detail hereinafter using the accompanying drawings, given by way of examples that are in no way limiting, wherein.

DETAILED DESCRIPTION OF THE INVENTION

Figure 1:
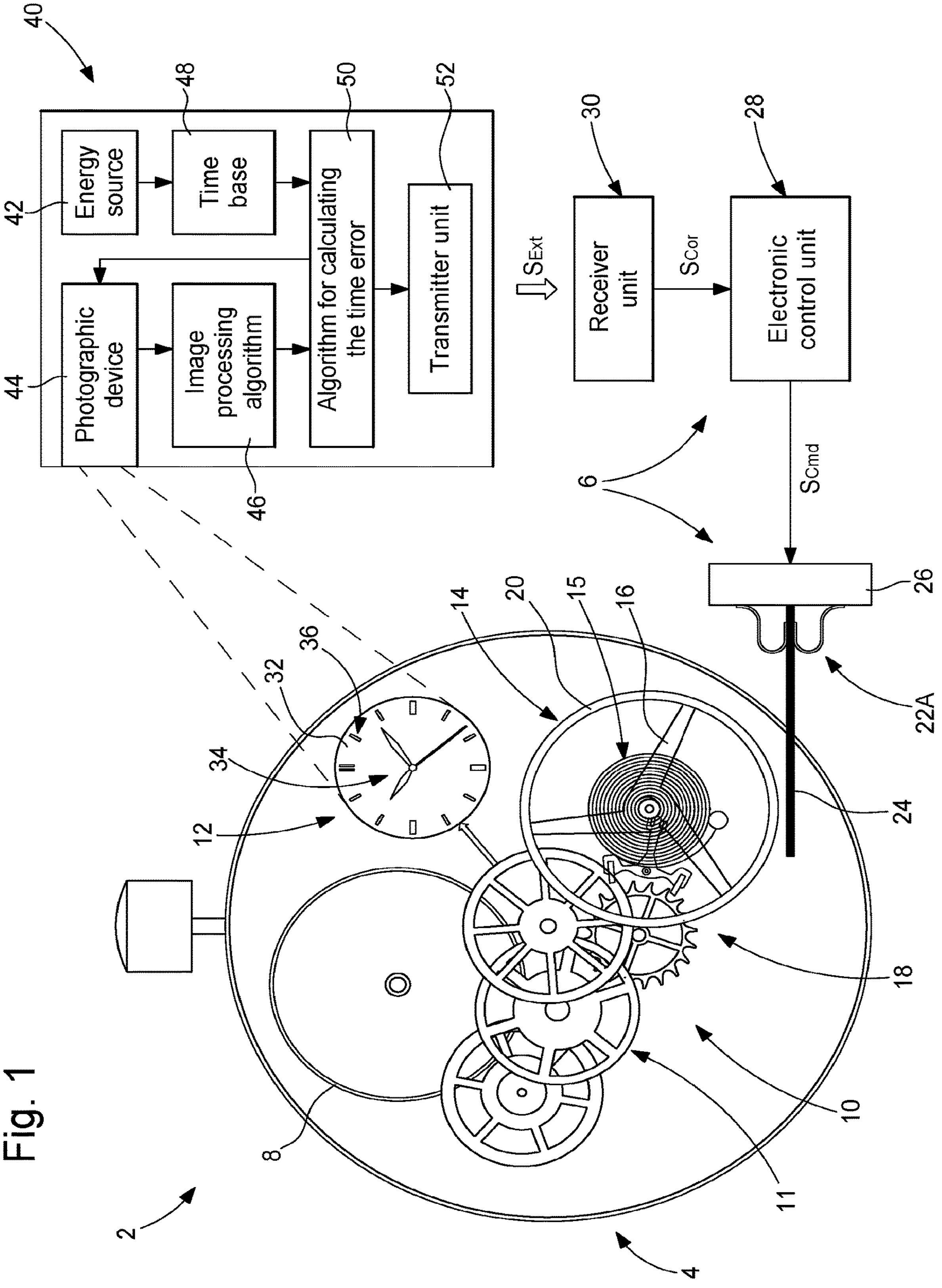
FIG. 1 shows a partially schematic view of a first embodiment of an assembly according to the invention comprising a timepiece, according to a first embodiment, which is provided with a mechanical movement, a time display and a device for correcting the displayed time, as well as an external electronic device, according to a first embodiment, which is arranged to be able to communicate with the correction module.
Figure 2:
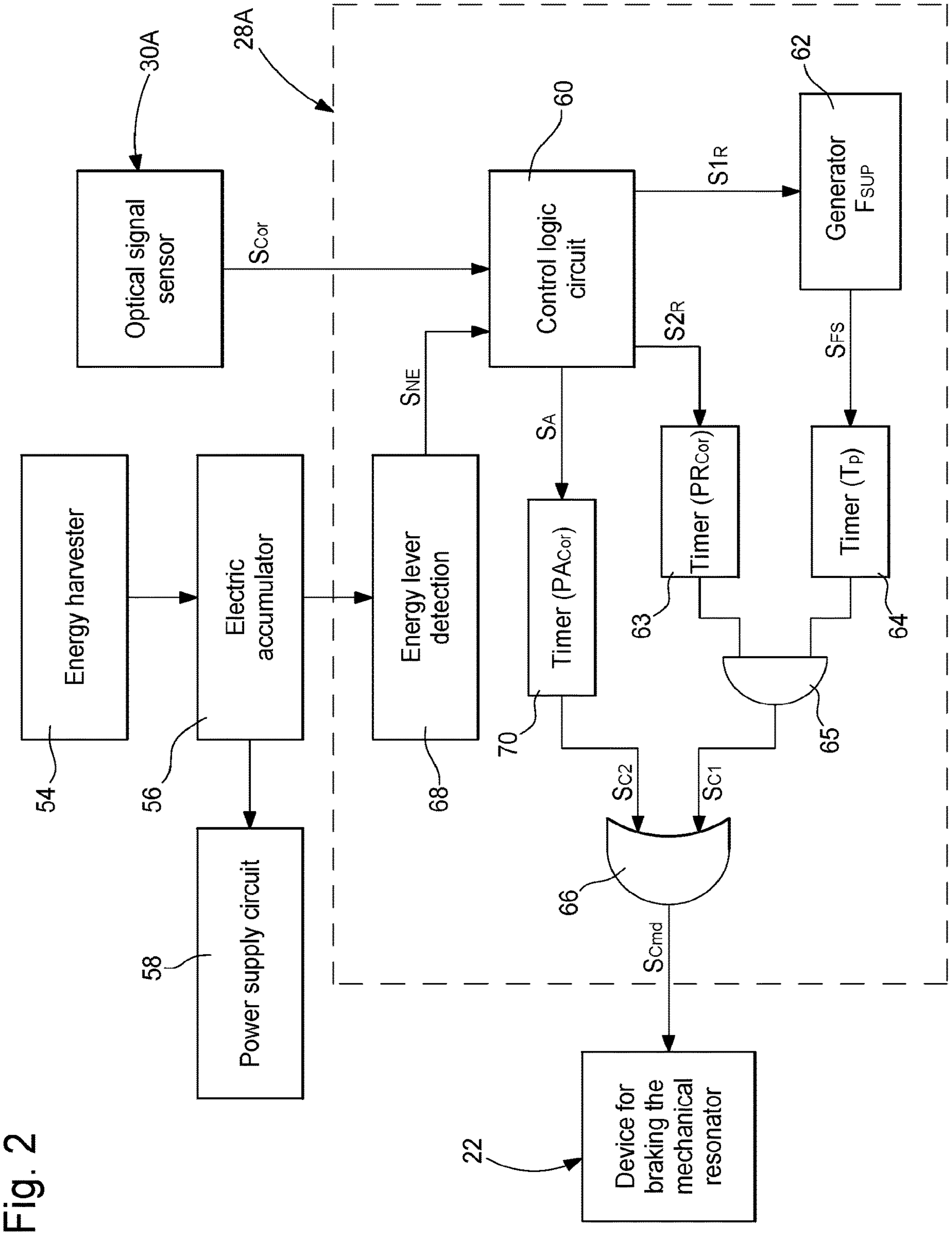
FIG. 2 schematically shows an alternative embodiment of the correction device of the timepiece according to the first embodiment in FIG. 1.

With reference to FIGS. 1 and 2, the description herein below will describe a first embodiment of a timepiece according to the invention, as well as a first embodiment of an assembly according to the invention comprising a timepiece according to the invention and an external electronic device formed by a mobile phone.

The timepiece 2 comprises a mechanical movement 4, an analogue time display 12, a drive mechanism 10 for driving this display and a device 6 for correcting the time indicated by the display. The mechanical movement comprises a barrel 8 forming a mechanical energy source for the drive mechanism 10 which is formed by a gear train 11, kinematically linked to the display, a mechanical resonator 14, formed by a balance 16 associated with a balance-spring 15, and an escapement 18 coupling this resonator to the drive mechanism such that the oscillation of the resonator times the running of this drive mechanism. The analogue display 12 is formed by a dial 32 comprising indexes 36 forming a graduation for the display of the actual time, and by hands 34 comprising an hours hand, a minutes hand and a seconds hand. The hands have different shapes, in particular different lengths and/or widths. Preferably, the indexes are arranged such that the '12 H' position for a 12-hour time cycle (or '24 H' for a 24-hour time cycle) can be visually identified. In the case shown, the '12 H' angular position is defined by two parallel and substantially radial bars, whereas the angular positions of the other hours are defined by a single bar.

Various alternative embodiments can be provided to allow for the determination of at least one angular position of the display corresponding to a determined number of minutes and/or of seconds on the graduation provided for displaying the minutes and/or seconds. It can be seen that the graduation is not necessarily visible. More specifically, for example, it suffices to know that there is a 12-hour cycle and that the '12 H' angular position is provided on a given and identifiable axis of the timepiece, and to have a visible mark on the display side enabling the 12H angular position to be identified on this given axis, and thus any other angular position corresponding to any hour, any minute and/or any second to be identified. For example, the dial can have a pattern that allows an orientation of the dial to be defined, or the dial comprises an additional sign defining a determined angular mark corresponding to a particular position of the graduation provided. Such an additional sign can also be placed on a flange surrounding the dial or on the bezel of the watch case into which the mechanical movement 4 is incorporated. It should be noted that the angular mark can be simply given by the shape of the case defining a determined axis that can be visually identified or by the winding button. It should be noted that the present invention is not limited to an analogue display of the actual time, but can also concern other displays displaying the actual time, for example a display with a 'jumping hour change' and/or in particular a 'jumping minute change'. The display is thus not limited to a system with hands advancing in a near-continuous manner. The invention can thus further apply in particular to a system with discs or rings and in particular a display provided through at least one aperture provided in the dial.

The correction device 6 comprises a receiver 30 receiving an external correction signal $S_{Ext}$ for correcting the time displayed by the display 12 and an electronic control unit 28 for the time displayed which is arranged so as to be able to process the information contained in the external correction signal $S_{Ext}$ and to generate, in response, at least one internal correction signal relating to a correction to the displayed time, which is determined by the external correction signal $S_{Ext}$, i.e. by the information contained in this external correction signal. The timepiece is arranged so as to allow the time indicated by the display thereof to be corrected as a function of the external correction signal $S_{Ext}$ that it receives. In order to correct the time displayed, the correction device generally comprises a device for braking the mechanical resonator. In a main alternative embodiment, the braking device is formed by an electromechanical actuator, for example an actuator of the piezoelectric type 22A. Furthermore, the braking device is controlled by an electronic control unit 28 which transmits a control signal $S_{Cmd}$ thereto in order to control the power supply circuit thereof so as to manage the timing of the application of a mechanical braking force on the mechanical resonator 14. In general, the correction device is arranged such that the braking device can act, whenever the external correction signal $S_{Ext}$ received by the timepiece requires the displayed time to be corrected, on the mechanical resonator 14 during a correction period to vary the running of the drive mechanism 10 so as to correct, at least for the most part, the time displayed.

In the alternative embodiment shown, the actuator 22A comprises a braking member formed by a flexible strip 24, which has, on two opposing surfaces (perpendicular to the plane in FIG. 1), respectively two piezoelectric layers, each of which is coated in a metal layer forming an electrode. The piezoelectric actuator comprises a power supply circuit 26 allowing a certain voltage to be applied between the two electrodes so as to apply an electric field through the two piezoelectric layers, which are arranged so as to curve the strip 24 towards the felloe 20 of the balance 14, when a voltage is applied between the two electrodes, so that the end part of the strip, forming a moving brake pad, can be pressed against the outer circular surface of the felloe and thus exert a mechanical braking force on the mechanical resonator. It should be noted that the voltage can be variable, in order to vary the mechanical braking force and thus the mechanical braking torque applied to the balance. As regards the braking device, reference can be made to the international patent document WO 2018/177779 for various alternative arrangements of such a braking device in a mechanical clock movement. In a specific alternative embodiment, the braking device is formed by a strip actuated by a magnet-coil system. In another specific alternative embodiment, the balance comprises a central staff defining or bearing a part in addition to the felloe of the balance, for example a disc, defining a circular braking surface. In the case above, a pad of the braking member is arranged so as to apply a pressure against this circular braking surface upon the momentary application of a mechanical braking force.

The receiver unit 30 is preferably a contactless receiver, for example a sensor for optical signals encoded according to a given communication protocol, a 'Bluetooth' receiver (preferably 'Bluetooth Low Energy': BLE) or a receiver for short-range wireless communication known as NFC. It should be noted that in the latter two cases, in practice, these are communication units that allow signals to be received and sent according to a predefined standard. The receiver unit 30 is arranged to be able to demodulate the external correction signal $S_{Ext}$ and to supply the electronic control unit 28 with a digital correction signal $S_{Cor}$ corresponding to the demodulated signal $S_{Ext}$.

One preferred alternative of a first embodiment of an assembly according to the invention comprises a timepiece according to the invention and a mobile phone 40 wherein at least one time-correcting application is installed for implementing the present invention, in particular for detecting an error in the time indicated by the display of the timepiece and providing a corresponding external correction signal $S_{Ext}$ to this timepiece. The mobile phone comprises its own resources which are used by the time-correcting application, in particular an energy source 42, a time base 48 giving the precise actual time, and a photographic device comprising a photographic sensor formed by an array of photodetectors. The time base can be formed by an electronic clock that is regularly synchronised to a precise actual time provided by the telephone network or by WIFI and/or by a GPS receiver. Thus, the time base provides a reference time that can be very precise, synchronised for example to an atomic clock giving the precise actual time of the location of the mobile phone and the user thereof. The photographic device 44 has a sensor formed by a pixel array to take a precise image of the analogue display 12.

The time-correcting application installed in the mobile phone comprises an image processing algorithm 46 or the application is arranged to be able to make use of such an algorithm which is the subject of a specific image processing application installed on the mobile phone or on a server to which the mobile phone has access, in particular via the Internet. The image processing algorithm is arranged to be able to determine the position of at least one determined hand of the analogue display 12 in an image captured by the photographic device 44, i.e. the position of this hand relative to a graduation provided for the display thereof, this graduation being capable of being reduced to a single visual mark for determining a particular position of a virtual graduation, as indicated hereinabove. In a display with two hands (hours and minutes), at least the angular position of the minutes hand will be determined relative to a mark on the dial 32 or to another part of the timepiece visible from the display side, enabling the displayed minute to be determined relative to the minutes graduation (whether visible or not). In a display with three hands (hours, minutes and seconds), at least the angular position of the minutes hand and that of the seconds hand will be determined. Reference is also made to the previous passage regarding various alternative embodiments that can be provided for determining at least one angular position of the display.

Then, the time-correcting application comprises an algorithm for calculating a time error between a first time datum, indicated by the display at a given moment in time and detected by the external device, in particular the mobile phone 40, via the photographic sensor thereof and the image processing algorithm thereof, and a second time datum corresponding to the first time datum and supplied at said given moment in time by the time base 48. As mentioned hereinabove, the first time datum can be the displayed minutes, the displayed minutes and seconds or the actual time displayed (hours, minutes and seconds).

Finally, the mobile phone 40 comprises a transmitter unit (a transmitter) for transmitting the external correction signal $S_{Ext}$. The transmitter unit is of the same type as the receiver unit (of the receiver) of the timepiece, in particular of the optical type (photodiode) or of the radio type (for example a BLE or NFC communication unit). The time-correcting application comprises a function for encoding the result provided by the algorithm for calculating a time error into a format specific to the transmitter unit 52 for sending the external correction signal $S_{Ext}$. Thus, when it is intended to correct the detected time error, the external correction signal supplied by the device external to the timepiece comprises information relating to this time error. Preferably, the information transmitted is the time error detected in the most precise unit that the time display allows, typically in seconds or in tenths of a second. It can be seen that the decision on whether to correct the display can be made by the application in the portable device or by the electronic control unit in the timepiece. If the detected error is zero, it is clear that no correction is required. If the detected error is non-zero but small, for example less than five seconds, it is possible in an alternative embodiment to decide that this error does not require correction. In other words, at least in one operating mode, a range of values can be defined for the detected time error for which no correction to the display is provided.

In another alternative embodiment, the algorithm for calculating a time error described hereinabove is provided such that it is incorporated into the timepiece. In such a case, the external correction signal $S_{Ext}$ contains the first time datum and the second time datum which are then processed by the algorithm for calculating a time error which is integrated into the electronic control unit located in the timepiece. In one embodiment where the timepiece comprises an internal electronic clock, in particular for an electronic module of the 'Fitness' type, the time of the time base of the mobile phone can additionally be transmitted, as additional information, to the timepiece. More specifically, the second time datum relates to the moment in time when the image was captured and does not correspond exactly to the moment in time when the external correction signal was transmitted, such that a complementary datum relating to a third time datum is advantageous if the provision, for an additional function, of a precise time to an internal electronic clock of the timepiece is desired.

FIG. 2 shows the device for correcting the timepiece according to the first embodiment. The receiver unit 30A is formed by a sensor for sensing an optical signal. This optical sensor comprises at least one element of the phototransistor type. In an alternative embodiment, it is part of or is constituted by a solar cell forming an energy harvester 54 and used to power an electric accumulator 56. In another alternative embodiment, the optical sensor 30A is an element that is separate from the energy harvester 56 that acts as a source of energy for a power supply circuit 58 of the correction device. The energy harvester can be formed by various types of devices known by a person skilled in the art, for example a magnetic, light or heat energy harvester. In an alternative embodiment, the magnetic energy harvester is arranged to receive energy from an external magnetic source allowing the electric accumulator to be recharged without electrical contact. In another advantageous alternative embodiment, the energy harvester is formed by a magnet-coil system allowing a small amount of energy to be harvested from the oscillation of the mechanical resonator of the timepiece and thus of the barrel sustaining this oscillation. In the above alternative embodiment, at least one magnet is arranged on the oscillating element of the resonator or on the support of the resonator and at least one coil is arranged respectively on said support or on said oscillating element, such that the majority of the magnetic flux generated by the magnet passes through the coil when the resonator oscillates in the usable operating range thereof. Preferably, the magnet-coil coupling is provided about the neutral position (rest position) of the resonator. In another alternative embodiment, wherein the mechanical movement is an automatic movement, the oscillating weight is used to drive a micro-generator producing electricity which is stored in the accumulator. It should be noted that the energy harvester can also be hybrid, i.e. formed by a plurality of different units, in particular of the wireless/contactless type, which are intended to harvest various energies from various energy sources and transform these various energies into electrical energy.

The electronic control unit 28A controls a device 22 for braking the resonator 14, in particular an electromechanical actuator 22A schematically shown in FIG. 1. Other types of actuators allowing a braking force to be momentarily applied to the mechanical resonator can be provided. Optionally, the electronic control unit comprises a circuit 68 for detecting the level of available electrical energy, this detection circuit providing a signal SNE to a control logic circuit 60 to provide it with information regarding the level of electrical energy available, such that this logic circuit can know whether the correction module has enough energy before launching an operation for correcting the time displayed. If this is not the case, the following various options are possible:

1) The timepiece has a transmitter allowing the user to be directly notified that the accumulator must be recharged to enable complete correction of the time displayed, for example via an optical signal or acoustic signal generated by the transmitter. The timepiece does not carry out any correction operation as long as the electrical energy level is insufficient for a correction operation to be completed.

2) The timepiece has a transmitter, in particular a BLE or NFC communication unit or an optical transmitter consisting of at least one light-emitting diode, allowing the mobile phone 40 to be notified that the accumulator needs to be recharged to enable the time displayed to be completely corrected. The mobile phone can thus show the user this information on the electronic display thereof. Alternatively, the timepiece does not carry out any correction operation as long as the electrical energy level is insufficient for a correction operation to be completed. According to an advantageous alternative embodiment, the mobile phone directly activates a recharge function for recharging the electric accumulator 56, via the energy harvester 54 or another energy harvesting device specific to transferring energy from the mobile phone, for example by magnetic induction.

3) The timepiece only carries out a partial correction of the time displayed using the energy available in the accumulator 56 and, preferably, informs the mobile phone, via a transmitter arranged in the timepiece, of the fact that the correction carried out will only be partial and optionally of the remaining error that the logic circuit 60 can calculate.

4) The timepiece does not carry out any corrections and does not transmit any information (simple alternative with a 'dumb' timepiece).

In the absence of an electrical energy management system as indication hereinabove, the timepiece can begin a required correction operation if the available electrical voltage is sufficient and can carry out this correction operation as long as the electrical voltage supplied by the power supply circuit 58 is sufficient. In an advantageous alternative embodiment, the correction device is placed in a standby mode when no operation for correcting the time displayed is planned, in order to save the electrical energy available in the accumulator 56. Various parts of the correction module can be activated, depending on the needs, during different periods only. Reference shall again be made herein below, within the scope of another embodiment, to the management of the power supply of the correction device according to the invention.

The electronic control unit 28A, incorporated into the first embodiment of the timepiece 2, comprises a control logic circuit 60, which receives the digital correction signal $S_{Cor}$ provided by the receiver 30A receiving the external correction signal $S_{Ext}$, and a generator device 62 generating a periodic digital signal having a given frequency $F_{SUP}$ (the generator device 62 is also referred to as a 'frequency generator' or simply as a 'generator' at the frequency $F_{SUP}$). Depending on whether the time error $T_{Err}$ to be corrected corresponds to a loss or to a gain in the display of the time, the control logic circuit 60 respectively generates either two control signals $S1_R$ and $S2_R$, which it respectively transmits to the frequency generator 62 and to a timer 63, or one control signal $S_A$ which it transmits to a timer 70. The timers 63 and 70 are programmable and are used to measure an intended correction period, respectively a period $PR_{Cor}$ for correcting a loss and a period $PA_{Cor}$ for correcting a gain. By definition, a gain corresponds to a positive error and a loss corresponds to a negative error. As mentioned hereinabove, the logic circuit receives either the time error $T_{Err}$ to be corrected (preferred alternative embodiment), or a time displayed by the timepiece at a given moment in time and the corresponding precise actual time provided by a time base of the external electronic device. In the second case, it calculates the time error $T_{Err}$ itself.

The arrangement of the electronic control unit 28A for correcting a detected loss in the time display will be described first, and only then will the arrangement of this unit for correcting a gain be described.

In the case of a negative error corresponding to a loss, according to a first loss-correction mode, the invention provides for generating a series of periodic braking pulses at a frequency $F_{SUP}$, these periodic braking pulses being applied by the braking device 22, in particular by the actuator 22A, to the oscillating resonator. For this purpose, the control logic circuit 60 activates the frequency generator 62 via the signal $S1_R$ and the timer 63 which counts up to or down from a time interval corresponding to a correction period $PR_{Cor}$, the duration (the value) whereof is determined by the logic circuit (by definition, the expression 'timer' encompasses a timer counting up to a given time interval in addition to a timer counting down to zero from this given time interval which is initially input into this timer).

In the alternative embodiment shown, when the frequency generator is activated, it provides a periodic digital signal $S_{FS}$, at the frequency $F_{SUP}$, to another timer 64 (timer having a value Tp corresponding to a selected duration for the periodic braking pulses). The outputs of the timers 63 and 64 are provided to an 'AND' logic gate 65 which outputs a periodic activation signal Sc, to periodically activate the braking device 22, during the intended correction period $PR_{Cor}$, via an 'OR' logic gate 66 or any other switching circuit allowing the periodic activation signal Sc, to be transmitted to the braking device. The periodic activation signal Sc, forms the control signal $S_{Cmd}$ in the case of correcting a loss detected in the time displayed by the timepiece. Thus, the braking device applies periodic braking pulses to the mechanical resonator at the frequency $F_{SUP}$ during a correction period $PR_{Cor}$, the duration (value) whereof depends on the loss to be corrected. As a general rule, the braking pulses have a dissipative nature since part of the energy of the oscillating resonator is dissipated during these braking pulses. In a main embodiment, the mechanical braking torque is applied substantially by friction, in particular by means of a mechanical braking member applying a certain pressure on a braking surface of the resonator, preferably a circular braking surface, as described hereinabove in the description of the timepiece 2 with reference to FIG. 1.

Preferably, as for the alternative embodiment shown in FIG. 1, the system formed by the mechanical resonator and by the device for braking this resonator is configured so as to enable the braking device to start, in the usable operating range of the oscillating resonator, a mechanical braking pulse substantially at any moment in the natural oscillation period of the oscillating resonator. In other words, one of the periodic braking pulses can substantially begin at any angular position of the oscillating resonator, in particular the first braking pulse occurring during a correction period.

According to the disclosure of the international patent document WO 2018/177779 already cited hereinabove, the average frequency of an oscillating resonator can be precisely regulated by applying thereto, in a continuous manner, periodic braking pulses at a braking frequency $F_{FR}$ advantageously corresponding to double the setpoint frequency F0c divided by a positive integer N, i.e. $F_{FR}=2\cdot F0_C/N$. The braking frequency $F_{FR}$ is proportional to the setpoint frequency F0c for the mechanical resonator and depends only on this setpoint frequency once the positive integer N is given. The international patent document WO 2018/177779 discloses that, after a transitory phase occurring at the start of the activation of the braking device applying the periodic braking pulses at the braking frequency $F_{FR}$, a synchronous phase is established during which the oscillation of the mechanical resonator is synchronised, on average, to the setpoint frequency F0c, provided that the braking torque applied by the braking pulses and the duration of these braking pulses are selected such that the braking pulses occur, during the synchronous phase, upon the passage of the mechanical resonator through extreme positions in the oscillation thereof, i.e. the reversal of the direction of the oscillatory motion occurs during each braking pulse or at the end of each braking pulse. The latter solution occurs in the advantageous case, which is in particular more reliable, whereby the mechanical resonator is halted by each braking pulse and subsequently remains blocked by the braking device until the end of this braking pulse.

Although of little interest, the international patent document WO 2018/177779 indicates that a synchronisation can also be obtained for a braking frequency $F_{FR}$ that is greater than double the setpoint frequency (2F0), in particular for a value equal to M·F0 where M is an integer greater than two (M>2). In an alternative embodiment where $F_{FR}=4\cdot F0$, the system merely loses energy with no effect during the synchronous phase, as one out of every two pulses occurs at the neutral point of the resonator, which is disadvantageous. For a higher braking frequency $F_{FR}$, pairs of pulses in the synchronous phase that do not occur at the extreme positions cancel out the effects of one another. It is thus understood that these are theoretical scenarios of no major practical interest. It should be noted that other braking frequencies can result in a synchronisation of the resonator to the setpoint frequency, however the conditions for implementing the regulation method are much more tedious and difficult to implement.

Within the scope of the development at the origin of the present invention, it was highlighted that the noteworthy phenomenon disclosed in the international patent document WO 2018/177779 can be used not only to continuously synchronise a resonator to the setpoint frequency thereof, but also to vary, in a determined manner, the oscillation frequency of a resonator in two frequency ranges respectively situated below and above the setpoint frequency thereof; i.e. a determined average frequency can be imposed on a mechanical resonator, which determined average frequency is different from the setpoint frequency thereof, being either greater than or less than same, by applying periodic braking pulses which can synchronise this resonator to a frequency that is different from the setpoint frequency but sufficiently close thereto to allow a synchronous phase to be established between the oscillating resonator and the braking device generating the braking pulses at a frequency selected for this purpose, while maintaining the oscillating resonator in a functional regime to time the running of the timepiece. The present invention proposes using this noteworthy discovery to correct the time displayed by a timepiece by varying the running of the mechanical clock movement considered, i.e. by varying the frequency of the resonator which times the running of the mechanism driving the display of the timepiece in question during a given correction period.

In particular, the first embodiment of the electronic control unit described here provides for correcting a loss detected in the time displayed according to a first loss-correction mode wherein, during a correction period $PR_{Cor}$, the oscillating resonator is synchronised to a correction frequency $FS_{Cor}$ which is greater than the setpoint frequency F0c. It has been shown within the scope of the development at the origin of the present invention that, in a manner similar to the case of a synchronisation to the setpoint frequency, the best results are obtained, for a correction frequency that is greater than or less than the setpoint frequency, when the braking frequency $F_{Bra}$ is selected, for a given correction frequency $F_{Cor}$, in order to satisfy the following mathematical equation:

$$F_{Bra} = 2\cdot F_{Cor}/N, \text{ where } N \text{ is a positive integer.}$$

Thus, the periodic braking pulses are applied to the mechanical resonator at a braking frequency $F_{Bra}$ advantageously corresponding to double the correction frequency $F_{Cor}$ divided by a positive integer N, that is preferably quite low. This equation is valid for a correction frequency $F_{Cor}=FS_{Cor}$ which is greater than the setpoint frequency and also for a correction frequency $F_{Cor}=FI_{Cor}$ which is less than the setpoint frequency (first gain-correction mode which will occur hereafter in another embodiment of a timepiece according to the invention). The braking frequency $F_{Bra}$ is thus proportional to the provided correction frequency $F_{Cor}$ and depends only on this correction frequency once the positive integer N is selected. The term 'synchronisation to a given frequency' is understood to mean synchronising on average to this given frequency. This definition is important for a number N greater than two. For example, in the case N=6, only one oscillation period in three undergoes a variation of the duration thereof, relative to the setpoint period T0c=1/F0c (thus relative to the natural/free oscillation period T0=1/F0), resulting from a time difference generated by each braking pulse in the oscillation of the resonator.

It should be noted that, as with the case of a synchronisation to the setpoint frequency, other braking frequencies can be used to obtain, under certain conditions, a synchronisation to a desired correction frequency, however the selection of a braking frequency $F_{Bra}=2\cdot F_{Cor}/N$ allows a synchronisation to the frequency $F_{Cor}$ to be obtained in a more effective and more stable manner. In general, the mathematical equation expressing the relationship between the braking frequency and the correction frequency is $F_{Bra}=(p/q)\cdot F_{Cor}$ where p and q are two positive integers and the number q is advantageously greater than the number p. A person skilled in the art can experimentally draw up a list of the fractional numbers p/q that are appropriate and under which conditions (in particular for which braking torque).

It can be seen that the braking pulses can be applied with a constant force couple or a non-constant force couple (for example substantially in a Gaussian or sinusoidal curve). The term 'braking pulse' denotes the momentary application of a force couple to the resonator which brakes the oscillating member thereof (balance), i.e. which opposes the oscillatory motion of this oscillating member. In the case of a variable torque, the pulse duration is generally defined as the part of this pulse that has a significant force couple for braking the resonator, in particular the part for which the force couple is greater than half the maximum value. It should be noted that a braking pulse can exhibit a significant variation. It can even be choppy and form a succession of shorter pulses. In general, the duration of each braking pulse is provided such that it is lower than half a setpoint period T0c for the resonator, however it is advantageously less than one quarter of a setpoint period and preferably less than T0C/8.

Figure 3:
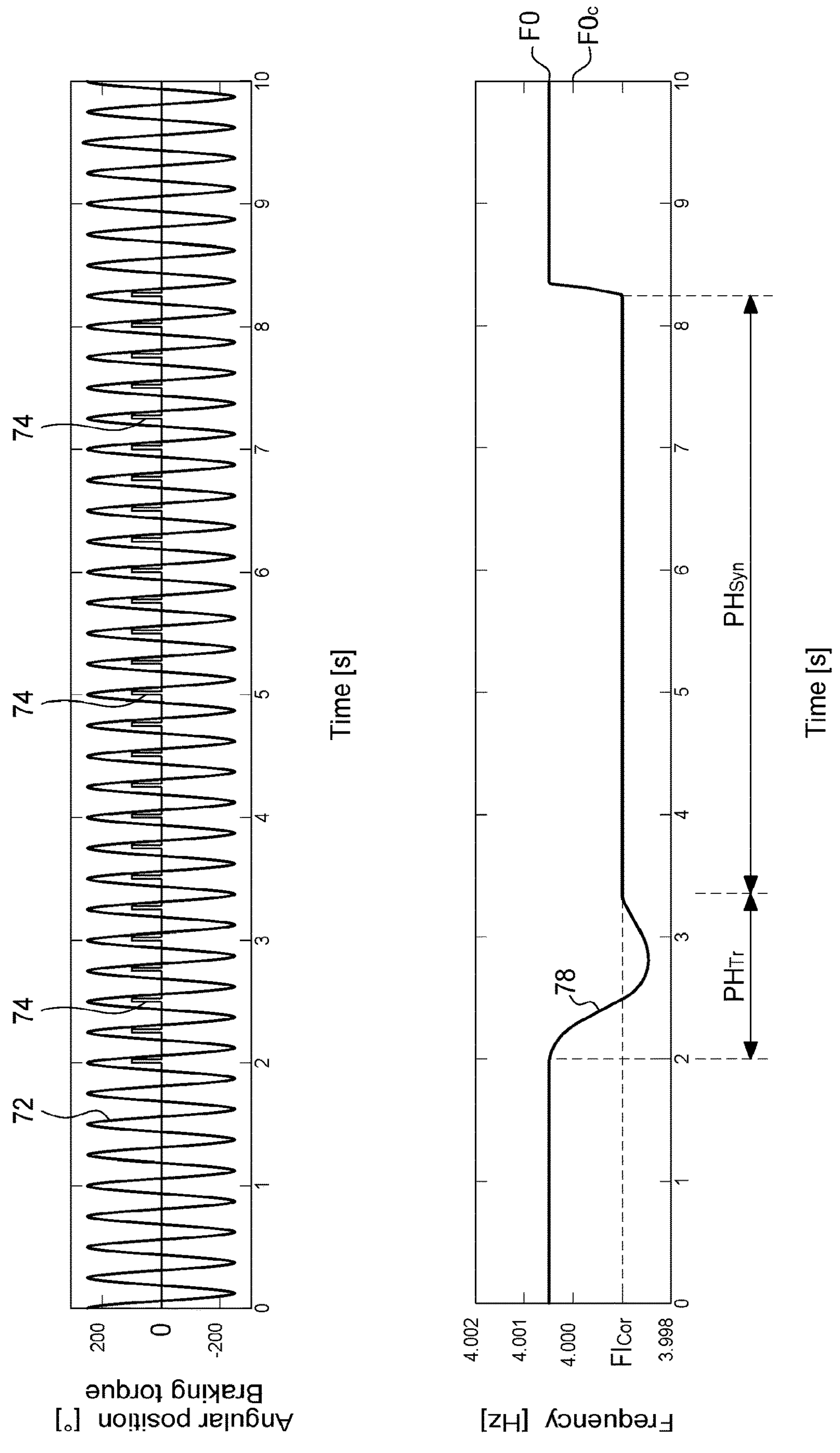
FIGS. 3 and 4 show, during a correction taking place via a series of periodic braking pulses, the changes to the oscillation frequency of a mechanical resonator during a gain-correction period, respectively a loss-correction period for the time indicated by a display of the timepiece considered, in the case of a ratio between the correction frequency and the setpoint frequency that is relatively close to the value '1'.
Figure 4:
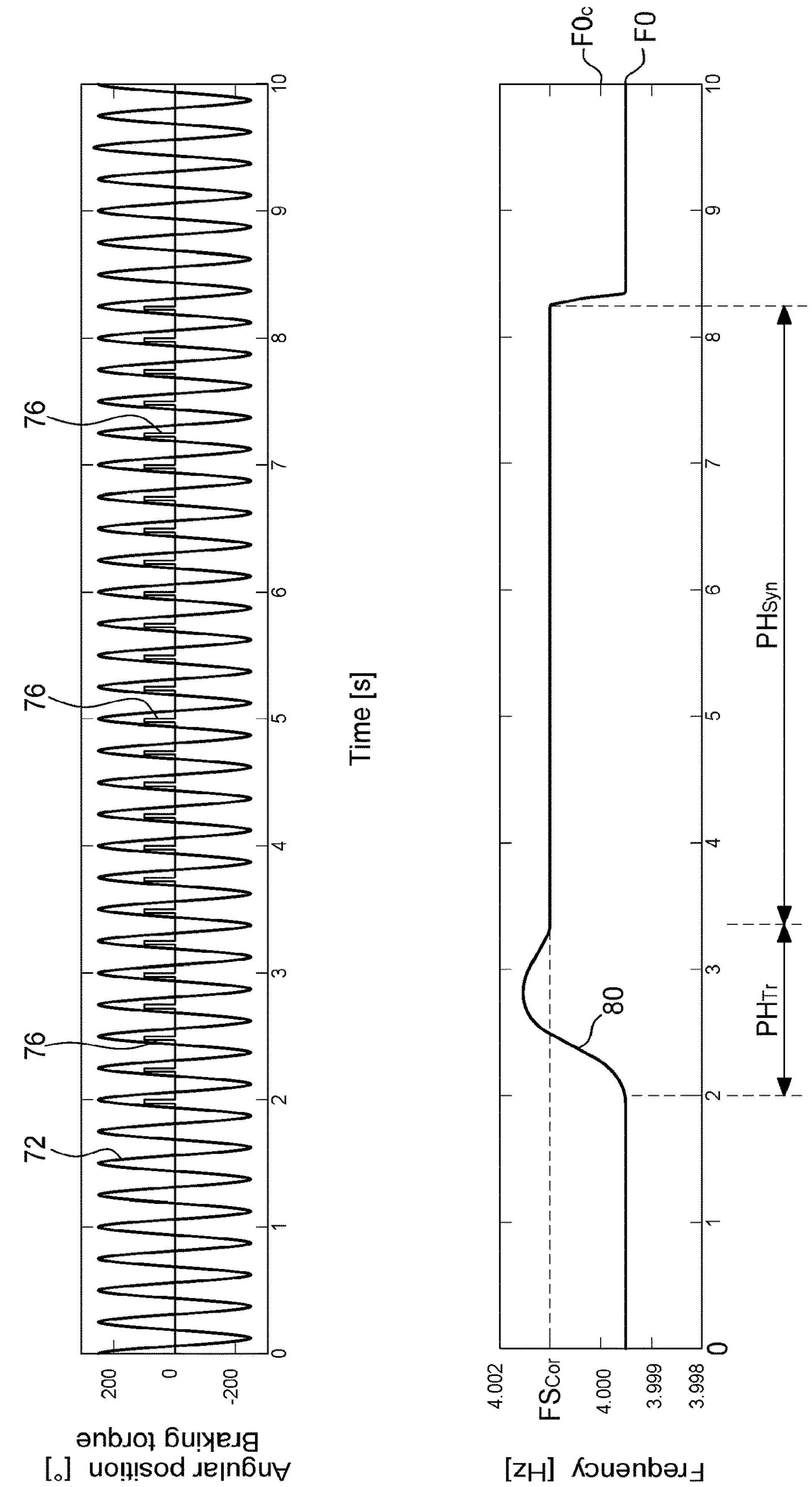

FIGS. 3 and 4 show, for a mechanical resonator having a setpoint frequency F0c=4 Hz and having an oscillation 72, respectively a first series of periodic braking pulses 74 applied to the resonator at a frequency $F_{INF}=2$. $FI_{cor}$ where $FI_{cor}=0.99975\cdot F0c=3.999$ Hz, for the case of a natural frequency F0=4.0005 Hz, and a second series of periodic braking pulses 76 applied to the resonator at a frequency $F_{SUP}=2$. $FS_{Cor}$ where $FS_{Cor}=1.00025\cdot F0c=4.001$ Hz, for the case of a natural frequency F0=3.9995 Hz. The bottom graphs in FIG. 3, 4 show the changes to the oscillation frequency of the resonator during a correction period, which is defined as being the period during which the braking pulses are applied to the resonator at the frequency $F_{INF}$ or $F_{SUP}$. The curve 78 shows the changes to the oscillation frequency of the mechanical resonator during the application of the first series of periodic braking pulses 74 to correct a gain detected in the time displayed, the braking frequency $F_{INF}$ resulting in a correction frequency $FI_{cor}$, given by the synchronisation frequency, which is less than the setpoint frequency F0c (first gain-correction mode). The curve 80 shows the changes to the oscillation frequency of the mechanical resonator during the application of the second series of periodic braking pulses 76 to correct a loss detected in the time displayed, the braking frequency $F_{SUP}$ resulting in a correction frequency $FS_{Cor}$, given by the synchronisation frequency, greater than the setpoint frequency (first loss-correction mode).

The very short correction period in FIGS. 3 and 4 was taken so as to show a full correction period while representing the oscillation of the resonator and the periodic braking pulses in a clearly visible manner on the graph giving the angular position of the resonator as a function of time. More specifically, in a few seconds, the possible correction is relatively small, in practice less than one second. For the correction frequencies chosen in FIGS. 3 and 4, the correction is thus very small. Thus, although the natural frequencies (natural/free frequencies) of the oscillating resonator are, in this case, within the norm for a mechanical watch, since they correspond to a daily error of about 10 seconds per day (gain, respectively loss), the correction frequencies are given purely for illustration purposes only and are much closer to the setpoint frequency than the correction frequencies which are generally provided for implementing the first gain- or loss-correction mode. In conclusion, FIGS. 3 and 4 are only given schematically to show, as a whole, the behaviour of the oscillating resonator when subjected to a series of periodic braking pulses at a correction frequency close to the setpoint frequency, yet different therefrom, and in the case of a natural frequency resulting in a conventional time drift. More detailed and precise considerations regarding the possible correction frequencies will be described herein below.

Figure 9:
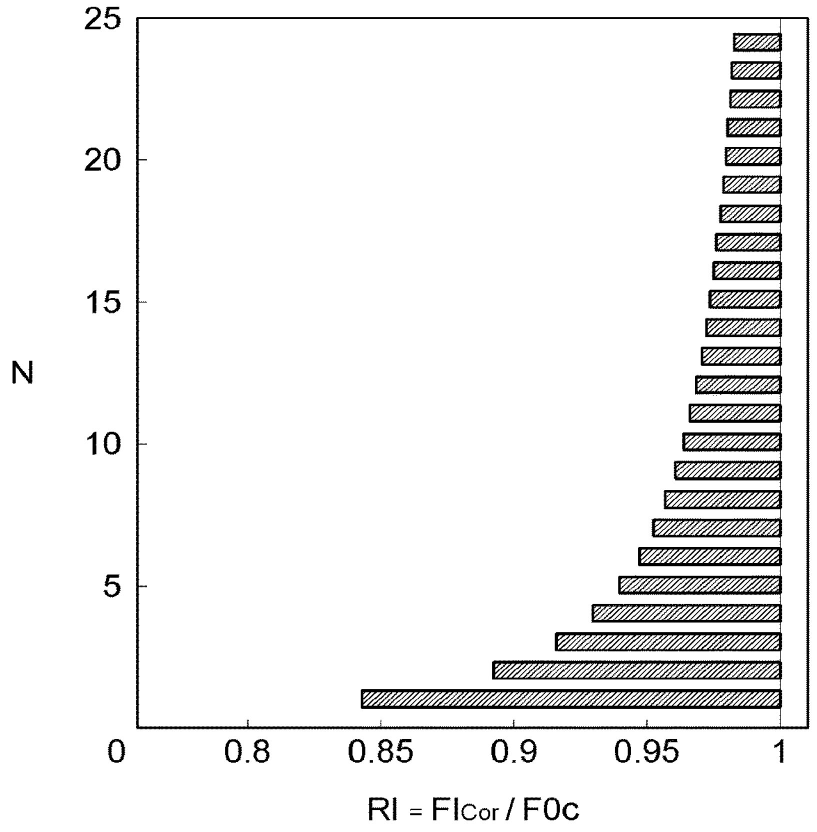
FIG. 9 is a graph showing, with approximation, for a given setpoint frequency, the possible correction frequency ranges for correcting a gain in the time display using short periodic braking pulses, as a function of a plurality of braking frequencies selected for the braking pulses.
Figure 10:
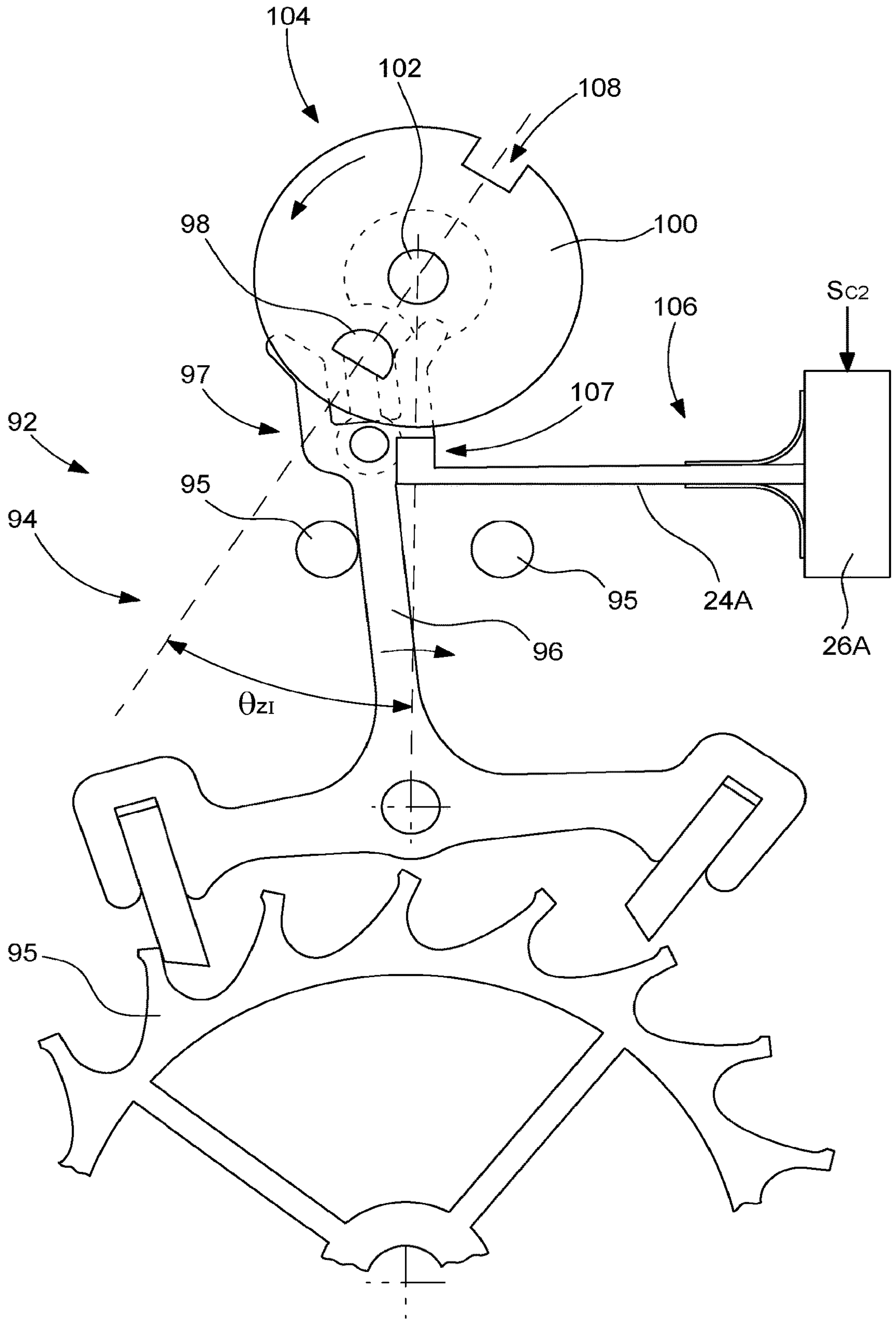
FIG. 10 partially shows a second embodiment of a timepiece according to the invention.
Figure 11:
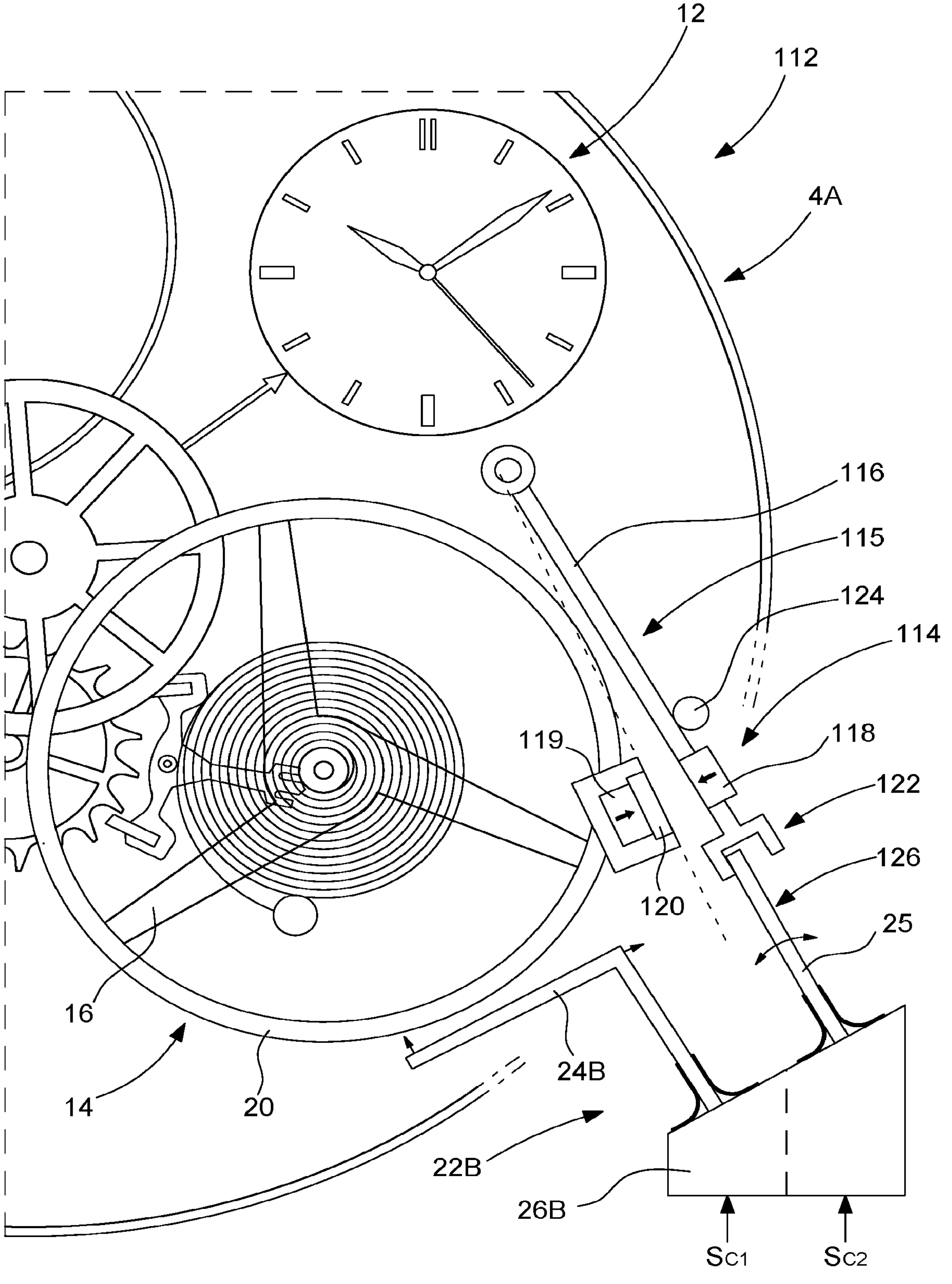
FIG. 11 partially shows a third embodiment of a timepiece according to the invention.

In the two graphs showing the frequency curves 78 and 80, at the start of the correction period, a transitory phase $PH_{Tr}$ can be seen, during which the frequency varies before stabilising at the frequency $FI_{cor}$, respectively $FS_{Cor}$ during a synchronous phase $PH_{Syn}$ following the transitory phase. In the two cases shown, the transitory phase $PH_{Tr}$ is relatively short (less than 2 seconds) and the changes to the frequency occur in the direction of the desired correction frequency. In the two cases shown, the average correction per unit of time during the transitory phase is approximately equal to that which occurs during the synchronous phase. However, it should be noted that the transitory phase can be longer, for example from 3 to 10 seconds, and the changes to the frequency during the transitory phase varies on a case-by-case basis such that the average correction is variable and undetermined, however it remains low in practice. Reference can be made to FIGS. 9 to 11 of the international patent document WO 2018/177779 wherein the transitory phases for synchronising the resonator to the setpoint frequency F0c, from a natural frequency that is close thereto yet different therefrom, are longer. It can be seen in FIG. 10 of this document that, when the setpoint frequency is greater than the natural frequency of the resonator, the oscillation frequency begins by decreasing at the start of the transitory phase before increasing to ultimately exceed the natural frequency and stabilise at the setpoint frequency.

The duration of the transitory phase and the changes to the frequency during this transitory phase depend on various factors, in particular on the braking torque, the duration of the pulses, the initial amplitude of the oscillation, and the moment at which the first braking pulse is applied in an oscillation period. It is thus difficult to control the time deviation resulting from a transitory phase relative to the setpoint frequency. By way of example, if $F_{Cor}=1.05\cdot F0c=4.2$ Hz and the transitory phase lasts 10 seconds at most, and if it is assumed that the average frequency during this transitory phase is equal to F0c, then the absolute time deviation relative to $F_{Cor}$ is at most equal to half a second. This uncertainty thus generates a small error in the correction generated during a correction period, however it is not negligible. A solution is described herein below to prevent such an error. In the first embodiment of the electronic control unit, a possible small error thus exists in the correction obtained if (the duration of) the correction period $PR_{Cor}$ is determined solely based on the time error $T_{Err}$ to be corrected, by defining this correction period as being the period during which a series of periodic braking pulses at the intended braking frequency is applied to the resonator, and by applying the hypothesis that the oscillation frequency during the correction period is that of the synchronisation frequency.

The synchronisation frequency determines the correction frequency. By definition, the correction frequency $F_{Cor}$ is equal to the synchronisation frequency. It can be seen that, in the synchronous phase of the correction period, the duration of the braking pulses must be sufficient for the braking torque applied to the resonator to be able to bring same to a halt (passage through an extreme angular position, defining the instantaneous amplitude thereof) during or at the end of each braking pulse. In the case of a synchronisation frequency that is greater than the setpoint frequency for correcting a loss, the time interval during which the resonator remains at a halt during a braking pulse decreases the possible correction per unit of time, such that this time interval is preferably limited, taking into account a certain safety margin, to obtain a shorter correction period thanks to a higher synchronisation frequency. It should be noted that the frequency of the braking pulses, the sustaining energy supplied to the resonator upon each alternation of the oscillation thereof and the value of the braking torque occur in the interval of time required to bring the oscillating resonator to a halt. For a given braking frequency and the resulting correction frequency, a person skilled in the art will know how to determine, in particular in an experimental manner or via simulations, a braking torque and a duration for the braking pulses in order to optimise the braking system. For setpoint frequencies between 2 Hz and 10 Hz, braking torques in the range 0.5 ρNm to 50 μNm and braking pulses in the range 2 ms to 10 ms appear to be generally appropriate for the correction frequencies that are advantageously used in practice (these value ranges being given in a non-limiting manner for illustration purposes).

Based on the aforementioned hypothesis, i.e. that the synchronisation frequency applies throughout the entire correction period $PR_{Cor}$, the value of the correction period to be provided can be determined based on the time error $T_{Err}$ to be corrected, on the setpoint frequency F0c and on the correction frequency $F_{Cor}$; and since the synchronisation frequency determines the correction frequency which is equal thereto, the value of the correction period to be provided can also be determined based on the time error $T_{Err}$ to be corrected, on the setpoint frequency F0c and on the braking frequency $F_{Bra}$. By definition, a gain in the time displayed corresponds to a positive error, whereas a loss corresponds to a negative error. The following mathematical equations are obtained for determining the value of the correction period:

$$P_{Cor} = T_{Err} \cdot F0c / (F0c - F_{Cor}) = 2T_{Err} \cdot F0c / (2F0c - N \cdot F_{Bra})$$

In the first loss-correction mode (negative error), the correction frequency $F_{Cor}=FS_{Cor}$ is greater than F0c, such that $P_{Cor}$ is positive. In such a case, the braking frequency $F_{Bra}=F_{SUP}$. The following equation is thus obtained:

$$PR_{Cor} = T_{Err} \cdot F0c / (F0c - FS_{Cor}) = 2T_{Err} \cdot F0c / (2F0c - N \cdot F_{SUP})$$

In the first gain-correction mode (positive error), the correction frequency $F_{Cor}=FI_{cor}$ is less than F0c, such that $P_{Cor}$ is positive. In such a case, the braking frequency $F_{Bra}=F_{INF}$. The following equation is thus obtained:

$$PA_{Cor} = T_{Err} \cdot F0c / (F0c - FI_{Cor}) = 2T_{Err} \cdot F0c / (2F0c - N \cdot F_{INF})$$

In an alternative embodiment, the external electronic device (mobile phone 40) has in memory, or receives from the timepiece considered, the setpoint frequency for the mechanical resonator of this timepiece and the higher frequency provided for correcting a loss (optionally as a function of ranges of values for this loss). Thus, in this alternative embodiment, the time-correcting application that is implemented in the external electronic device can determine the value of the correction period $PR_{Cor}$ and communicate this information to the timepiece via the external correction signal $S_{Ext}$. In this alternative embodiment, the electronic control unit of the timepiece does not need resources to calculate the value of the correction period on the basis of the time error $T_{Err}$ to be corrected.

Following the general description regarding a correction of the running of a mechanical timepiece obtained by a series of periodic braking pulses applied to the resonator thereof, we can now return to the first embodiment of the timepiece according to the invention. The electronic control unit 28A (FIG. 2) is arranged to provide the braking device, whenever the external correction signal $S_{Ext}$ received by the receiver unit of the timepiece 2 corresponds to a displayed time loss that is to be corrected, with a control signal Sc, derived from the periodic digital signal $S_{FS}$ provided by the frequency generator 62, during a correction period $PR_{Cor}$, to activate the braking device 22 such that this braking device generates a series of periodic braking pulses that are applied to the resonator at the frequency $F_{SUP}$. Since (the duration of) the correction period is determined by the loss to be corrected, the number of periodic braking pulses in the series of periodic braking pulses is thus also determined by the loss to be corrected. The frequency $F_{SUP}$ is provided and the braking device is arranged such that each series of periodic braking pulses at the frequency $F_{SUP}$ can, during the corresponding correction period, result in a first synchronous phase wherein the oscillation of the resonator is synchronised (by definition 'synchronised on average') to a correction frequency $FS_{Cor}$ which is greater than the setpoint frequency F0c provided for the mechanical resonator.

With reference to FIGS. 5 to 10, the paragraphs below will give several observations regarding the braking pulses, in particular concerning the braking frequencies $F_{Bra}$ and the corresponding correction frequencies $F_{Cor}$ which are advantageously considered for a preferred alternative embodiment of the first loss-correction mode, and also for a preferred alternative embodiment of a first gain-correction mode (which will be implemented in an embodiment described hereafter) wherein a gain detected in the time displayed is intended to be corrected by a series of braking pulses at a frequency $F_{INF}$, already defined hereinabove, resulting in a correction frequency $FI_{Cor}$, also defined hereinabove, which is less than the setpoint frequency F0c.

Figure 5:
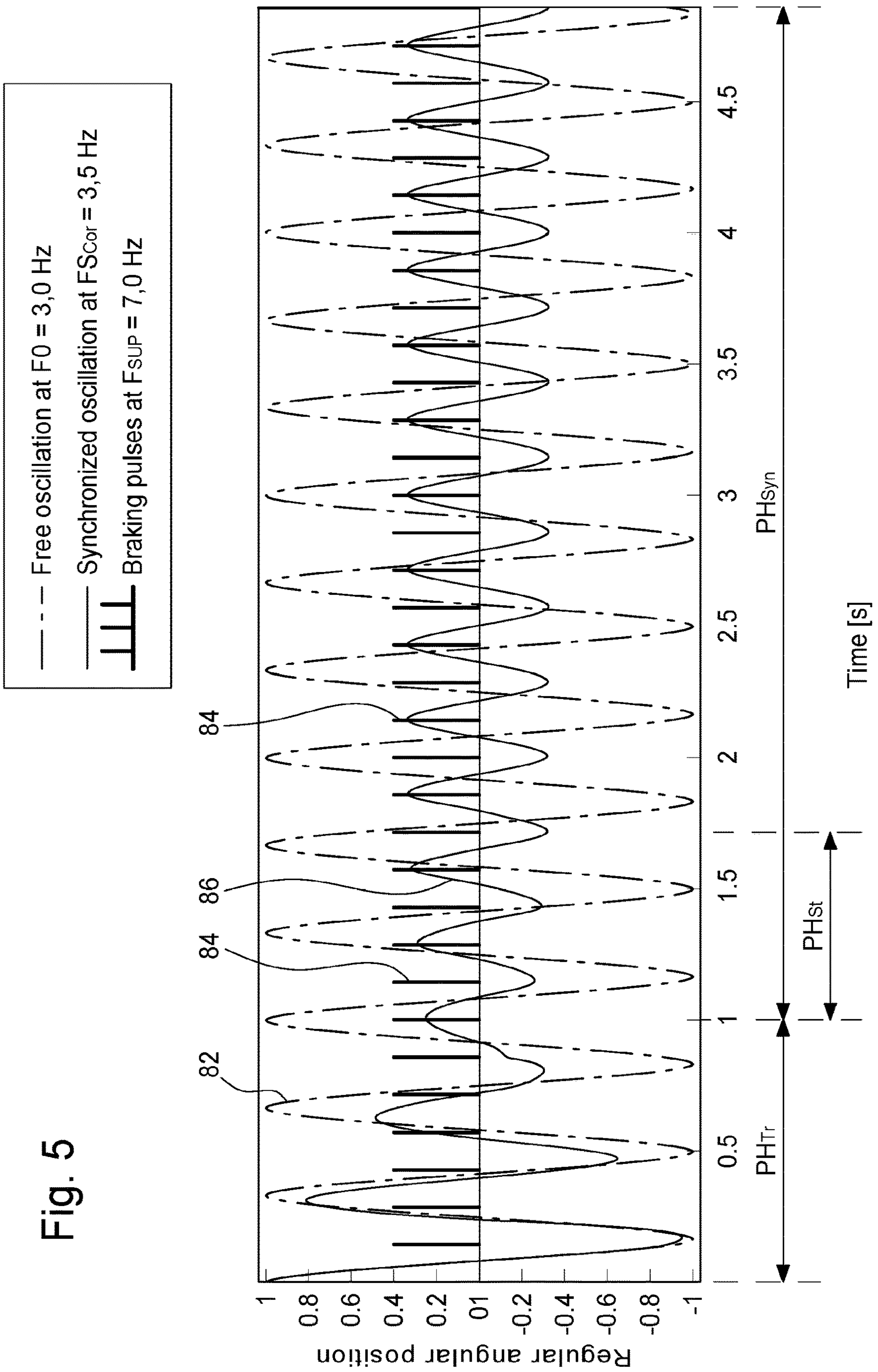
FIG. 5 shows, in the case of a relatively high ratio between the correction frequency and the setpoint frequency, the oscillation of a mechanical resonator at the start of a loss-correction period involving a series of periodic braking pulses, this correction period having an initial transient phase.

FIG. 5 shows a first part of a correction period with a relatively high ratio between the correction frequency $FS_{Cor}$=3.5 Hz and the setpoint frequency F0c=3.0 Hz (substantially equal to the natural frequency of the resonator when oscillating freely, represented by the oscillation 82), i.e. a ratio $RS=FS_{Cor}/F0c$=3.5/3.0=1.167. When braking pulses 84 with a braking frequency $F_{Bra}=F_{SUP}=2 \cdot FS_{Cor}$=7.0 Hz (case of N=1) and a sufficient braking force couple are applied to the mechanical resonator, allowing, in the transitory phase $PH_{Tr}$, the amplitude of the oscillation 86 of the oscillating resonator to be sufficiently decreased to ultimately come to a halt during each braking pulse, the corresponding correction frequency, i.e. $FS_{Cor}$=3.5 Hz can be relatively quickly imposed on this resonator. It can be seen that the desired synchronisation is obtained in the example given after just one second, however a phase $PH_{St}$ during which the oscillation is stabilised occurs at the start of the synchronous phase $PH_{Syn}$. In the case shown, the amplitude increases again during the stabilisation phase to ultimately stabilise at an amplitude corresponding to about one third of the initial amplitude of the free resonator.

A demonstrator (a prototype of the timepiece according to the invention) has been produced for the case presented in FIG. 5. By applying periodic braking pulses at the frequency $F_{SUP}$=7.0 Hz to the mechanical resonator, a gain of 7 hours was obtained on the display of the timepiece for a correction period of 6 hours in a very precise manner. Precisely 1 hour was thus 'gained' in an actual time of 6 hours. Such a result paves the way for corrections to the time indicated by the display that differ from the corrections made to a time drift of this display solely the result of an imprecision of the resonator operating freely (i.e. in the absence of braking pulses). Thus, as will be seen in another embodiment described herein below, the present invention allows the 1-hour jump which occurs at a seasonal change of time (in particular for the change from standard time to daylight saving time where the legal time is brought forward) to be corrected. Correction of a time zone change that may occur during a trip can also be considered.

Figure 6:
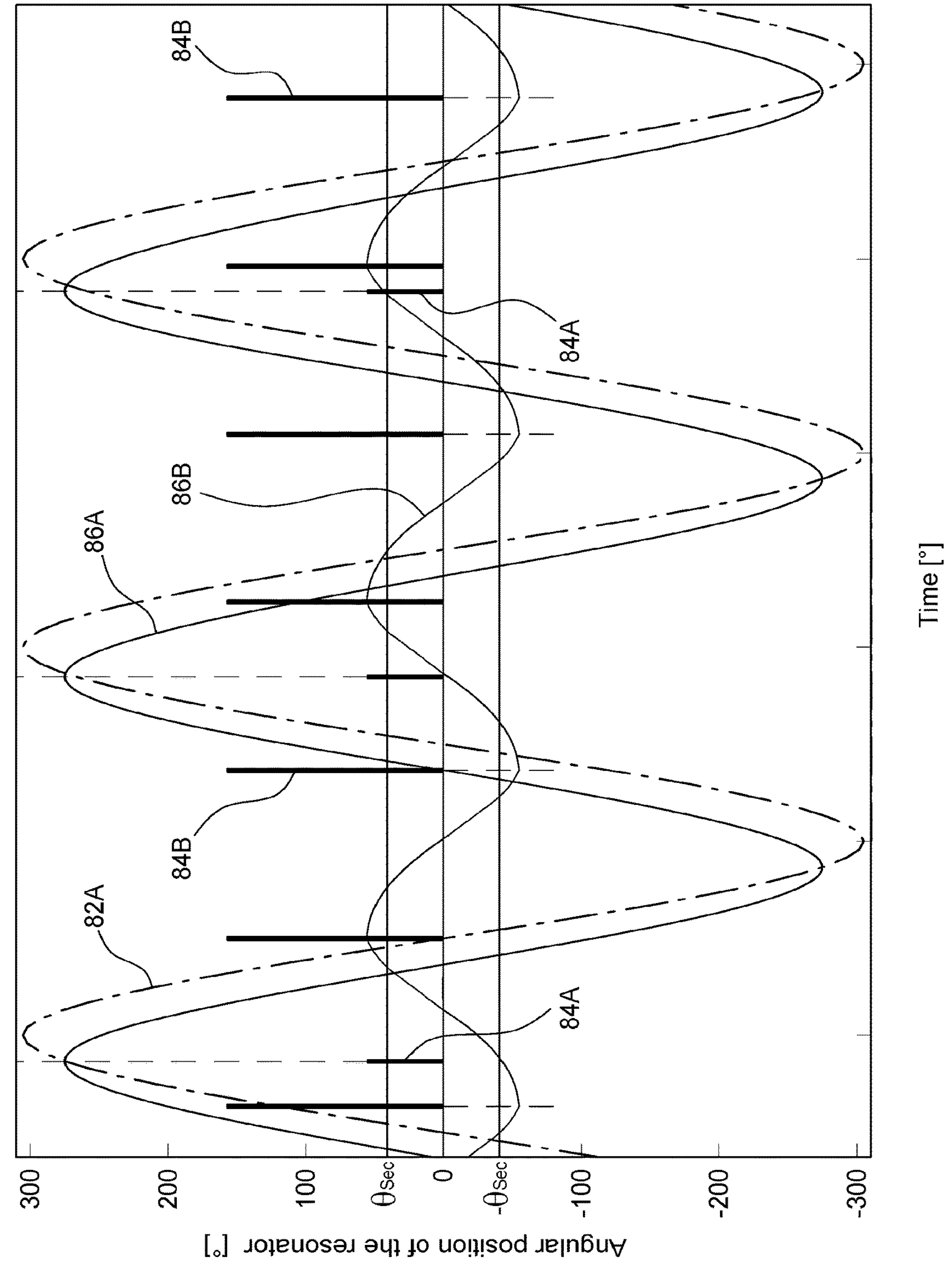
FIG. 6 shows, during a loss correction carried out using a series of periodic braking pulses, several oscillation periods of a mechanical resonator during a synchronous phase for two different synchronisation frequencies.

FIG. 6 shows the free oscillation 82A of a mechanical resonator, a first oscillation 86A of this resonator in a synchronous phase of a correction period wherein the ratio RS between the correction frequency $FS_{Cor}$ and the setpoint frequency F0c is relatively low (i.e. relatively close to '1'), and a second oscillation 86B of this resonator in a synchronous phase of a correction period wherein the ratio RS between the correction frequency $FS_{Cor}$ and the setpoint frequency F0c is relatively high (i.e. relatively far from '1'). The first oscillation 86A results from a series of periodic braking pulses 84A of relatively low intensity and occurring once per oscillation period (which corresponds to the case of N=2 where $F_{SUP}=FS_{Cor}$). However, the second oscillation 86B results from a series of periodic braking pulses 84B of relatively high intensity and occurring once per alternation of the oscillation (which corresponds to the case of N=1, i.e. $F_{SUP}=2\cdot FS_{Cor}$).

By selecting, in an appropriate manner, the braking torque and the braking frequency, it can be seen that the correction frequency can continuously vary between the setpoint frequency F0c and a certain higher frequency $FSC_{max}$, for correcting a loss in the time displayed, and can continuously vary between the setpoint frequency F0c and a certain lower frequency $FIC_{max}$, for correcting a gain in the time displayed. The higher frequency $FSC_{max}$ and the lower frequency $FIC_{max}$ are not values that can be easily calculated theoretically. They must be determined in practice for each timepiece. It can be seen that although this information is of interest, it is not essential. What is important is that the braking frequencies are selected and the braking torques available are appropriate for generating, during each correction period, preferably quite quickly, a synchronous phase during which the mechanical resonator can oscillate at the correction frequency provided for by the mathematical equation given hereinabove, without the oscillation thereof being brought to a halt (i.e. the resonator must not be halted such that it cannot restart from the halted position, which would cause the drive mechanism of the display to come to a halt).

FIG. 6 shows a safety angle $\theta_{Sec}$ beneath which, in absolute value form, the mechanical resonator is prevented from coming to a halt (i.e. between $-\theta_{Sec}$ and $\theta_{Sec}$), and thus above which the amplitude, in absolute value form, must practically remain during the synchronous phase, at least after the stabilisation phase. Advantageously for the operation of the mechanical resonator, the angle $\partial_{Sec}$ is equal or, preferably, greater than an angle $\theta_{ZI}$ (see FIG. 10) which corresponds to the coupling angle between the resonator and the escapement associated therewith, on either side of the neutral position of the resonator defined by the angular position of the coupling pin borne by the plate of the balance when this resonator is at or passes through the rest position thereof. In order to halt the mechanical resonator during a braking pulse, the angular coupling zone ($-\theta_{ZI}$ to $\theta_{ZI}$) of the mechanical resonator with the escapement is thus declared to be a 'prohibited zone' (it can be seen that braking is possible within this prohibited zone during the transitory phase, however the resonator is prevented from coming to a halt in this prohibited zone). It should be noted that, within the usable operating range of the resonator, in order to preserve correct operation of the escapement and in particular to guarantee the unlocking phase, the safety angle $\theta_{Sec}$ could need to be greater than the coupling angle $\theta_{ZI}$. A person skilled in the art will be able to determine a value for the safety angle $\theta_{Sec}$ for each mechanical movement associated with a correction device according to the first embodiment. The coupling angle $\theta_{ZI}$ can vary from one mechanical movement to another, in particular between 22° and 28°.

The condition of not blocking the resonator in the angular safety zone during the loss-correction period is important since the passing time must continue to be counted via the escapement (i.e. the timing of the running of the drive mechanism of the time display) during this loss-correction period. Thus, in a highly advantageous manner, said frequency $F_{SUP}$ and the duration of the periodic braking pulses are selected such that, during said synchronous phase of a correction period within the scope of the first loss-correction mode, each of the periodic braking pulses occur outside a coupling zone of the oscillating mechanical resonator with the escapement, preferably outside a safety zone defined for the mechanical movement. This also applies when selecting said frequency $F_{INF}$ and the duration of the periodic braking pulses within the scope of the first gain-correction mode.

In order to orient a person skilled in the art as regards the choice of correction frequencies and corresponding braking frequencies, a mathematical model has been drawn up based on the equation of the motion of a mechanical oscillator. To determine a maximum positive or negative correction, the resonator is considered to be in a synchronous and stable phase. Furthermore, a simplification is introduced for the sustain force applied to the resonator by the energy source via the escapement, considered to be of the type cos(ωt). It should be noted that this simplification is sensible since it reduces the maximum value relative to the actual case where all of the energy supplied to the resonator occurs in the prohibited zone $\theta_{ZI}$ defined hereinabove. Finally, the duration of the braking pulses is considered to be very small, thus isolated, by defining the braking frequency $F_{Bra}$ as the inverse of the time value $T_{Sec}$ at which the resonator reaches, in the equation of the motion given herein below, the safety angle $\theta_{Sec}$ in the half-alternation corresponding to the number N selected in the equation $F_{Cor}=NF_{Bra}/2$.

To determine the maximum correction and thus the minimum or maximum period depending on whether the time error to be corrected is negative (loss) or positive (gain), the time t=0 is given by a braking pulse during which the oscillator is brought to a halt at the safety angle $\theta_{Sec}$. Furthermore, in the stable synchronous phase, the resonator must halt the following braking pulse as early as possible, respectively as late as possible, also at the safety angle $(-1^{N})\cdot\theta_{Sec}$ in a time range given by the value of N and by the fact that the correction frequency is provided such that it is greater than or less than the setpoint frequency F0c to correct the loss or the gain.

In such a case, the equation of the motion is given by:

$$\theta(t) = \left(\theta_0 + (\theta_{Sec} - \theta_0)e^{-\frac{t}{\tau}}\right) \times \cos(2\pi f_0 t)$$

where T=Q·T0/π, T0 is the free oscillation period (considered to be equal to T0c=1/F0c for the calculations) and $\theta_0$ is the amplitude of the free oscillation.

It can thus be seen that the quality factor Q of the mechanical resonator is included in the equation of the motion.

To obtain a correction frequency $FS_{Cor}$ that is greater than the setpoint frequency F0c, $T_{Sec}$ must occur in an alternation after the passage of the resonator through the neutral/rest position thereof. The following is thus obtained for a given N:

$$\theta(T_{Sec}) = -1^N \theta_{Sec} \text{ where } T_{Sec} \in \left[\frac{(2N-1)}{4} T_0, \frac{N}{2} T_0\right]$$

The maximum braking frequency $FSB_{max}(N)=1/T_{Sec}$ and the maximum correction frequency $FSC_{max}(N)=N \cdot FSB_{max}/2$.

To obtain a correction frequency $FI_{Cor}$ that is less than the setpoint frequency F0c, $T_{Sec}$ must occur in an alternation before the passage of the resonator through the neutral/rest position thereof. The following is thus obtained for a given N:

$$\theta(T_{Sec}) = -1^N \theta_{Sec} \text{ where } T_{Sec} \in \left[\frac{N}{2} T_0, \frac{2N+1}{4} T_0\right]$$

The minimum braking frequency $FIB_{min}(N)=1/T_{Sec}$ and the minimum correction frequency $FIC_{min}=N \cdot FIB_{min}/2$.

Figure 7A:
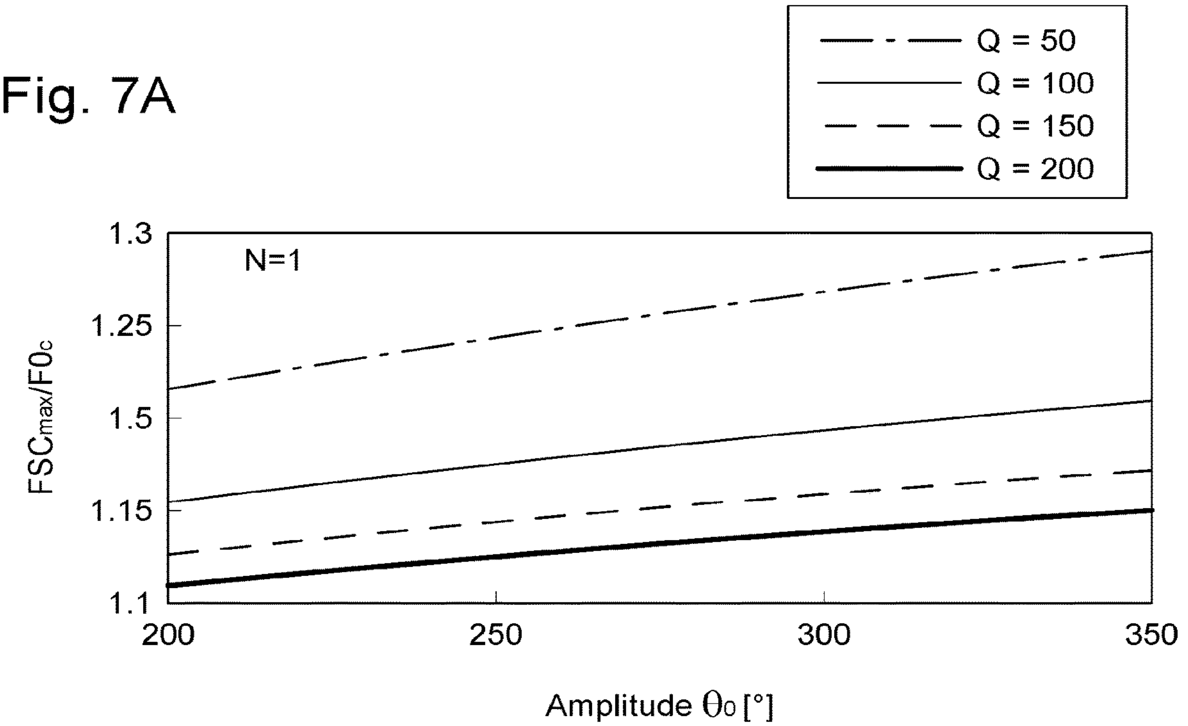
FIG. 7A shows, for a braking frequency corresponding to one braking pulse per alternation of the oscillation of a mechanical resonator, a plurality of curves of the maximum relative synchronisation frequency as a function of the amplitude of the free oscillation of the resonator and of the quality factor thereof.
Figure 7B:
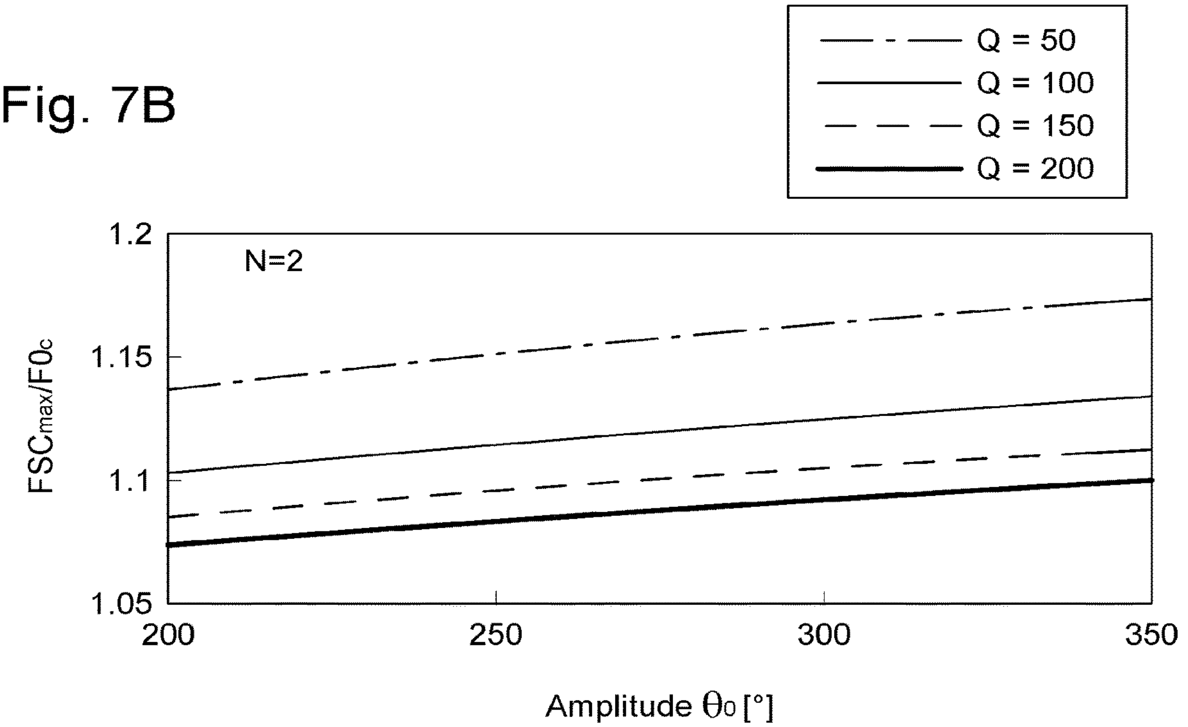
FIG. 7B shows, for a braking frequency corresponding to one braking pulse per period of oscillation of a mechanical resonator, a plurality of curves of the maximum relative synchronisation frequency as a function of the amplitude of the free oscillation of the resonator and of the quality factor thereof.

FIGS. 7A and 7B respectively show the curves of $RS_{max}(N=1)=FSC_{max}(N=1)/F0c$ and $RS_{max}(N=2)=FSC_{max}(N=2)/F0c$ as a function of the amplitude 80 of the free oscillation of the mechanical resonator for various quality factors Q of this mechanical resonator. It can be seen that the smaller the quality factor, the greater the ratio $RS_{max}(N)$.

Figure 8:
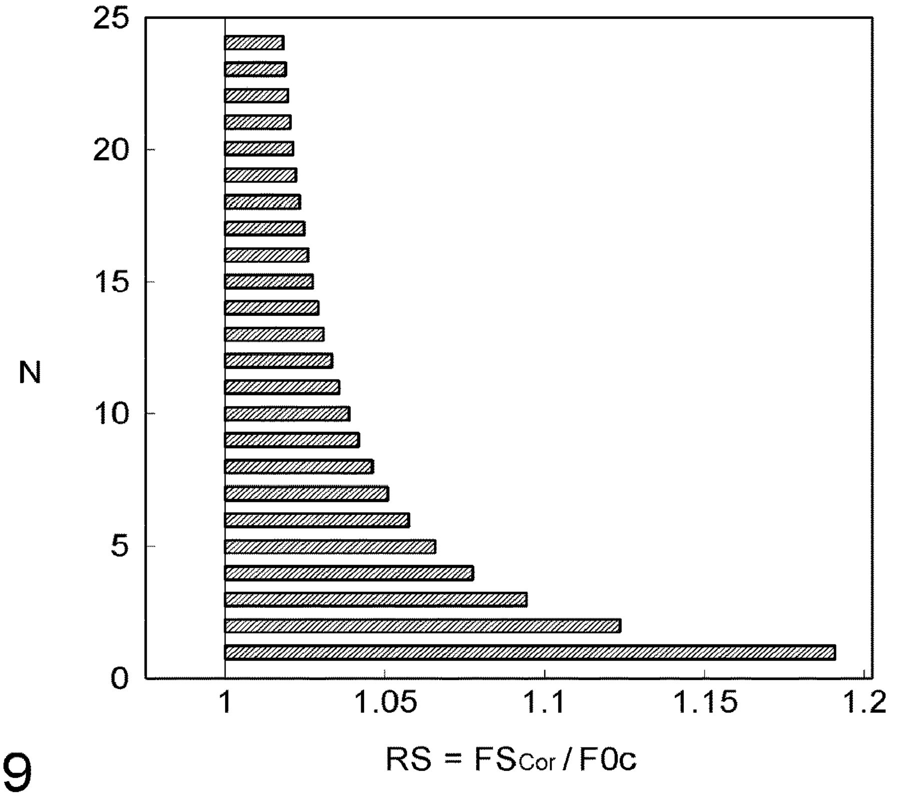
FIG. 8 is a graph showing, with approximation, for a given setpoint frequency, the possible correction frequency ranges for correcting a loss in the time display using short periodic braking pulses, as a function of a plurality of braking frequencies selected for the braking pulses.

FIG. 8 gives, for a resonator having a quality factor Q=100, a free amplitude $\theta_0$=300° and a safety angle $\theta_{Sec}$=25°, the greater correction frequency ranges, for a setpoint frequency F0c and various respective values of N, which can be considered within the scope of the first loss-correction mode, showing the ratio $RS=FS_{Cer}/F0c$ which extends between the value '1' and $RS_{max}(N)$.

FIG. 9 gives, for a resonator having a quality factor Q=100, a free amplitude $\theta_0$=300° and a safety angle $\theta_{Sec}$=25°, the lower correction frequency ranges, for a setpoint frequency F0c and various respective values of N, which can be considered within the scope of the first gain-correction mode, showing the ratio RI=Flag/F0c which extends between $RI_{max}(N)$ and the value '1'.

As stated hereinabove, the ranges given in FIGS. 8 and 9 are the result of a simplified theoretical model. The maximum and respectively the minimum correction frequencies can be seen to depend on a plurality of parameters. These figures give a good indication of the reality for a mechanical movement having fairly standard properties. However, for each given mechanical movement, the limit values must be defined when looking to get close thereto to carry out large corrections in relatively short correction periods.

After having described in detail the arrangement of the electronic control unit and the operation of the correction device of the first embodiment of the timepiece according to the invention for correcting a loss in the time displayed by the timepiece, the arrangement of the electronic control unit according to this first embodiment will now be described for correcting a gain in the time displayed according to a second gain-correction mode.

To allow the second gain-correction mode to be implemented, the timepiece comprises a device for blocking the mechanical resonator. In general, within the scope of the second gain-correction mode, the electronic control unit is then arranged such that it can provide the blocking device, when the external correction signal received by the receiver unit corresponds to a displayed time gain that is to be corrected, a control signal which activates the blocking device such that this blocking device blocks the oscillation of the mechanical resonator during a correction period determined by the gain to be corrected, in order to halt the running of said drive mechanism during this correction period.

In the first embodiment described with reference to FIGS. 1 to 2, the timepiece 2 comprises a blocking device which is formed by the braking device 22, in particular by the piezoelectric actuator 22A, which is also used to implement the first loss-correction mode. When the external correction signal $S_{Ext}$ received by the receiver unit 30 corresponds to a gain in the time displayed which is to be corrected, the logic circuit 60 of the electronic control unit 28A (FIG. 2) provides a control signal $S_A$ to the timer 70 which is programmable. This timer 70 thus generates a signal $S_{C2}$ for activating the braking device 22, via the 'OR' gate 66 or another switch, for a correction period $PA_{Cor}$, the duration whereof is substantially equal to the corresponding gain $T_{Err}$ to be corrected. The periodic activation signal $S_{C2}$ thus forms the control signal $S_{Cmd}$. It can be seen that the activation signal $S_{C2}$ controls the braking device 22 in a blocking mode of the mechanical resonator for a relatively long time, i.e. during substantially the entire correction period $PA_{Cor}=T_{Err}$. For this purpose, the voltage thus supplied by the power supply circuit 26 between the two electrodes of the piezoelectric strip 24 can differ from that provided to generate the periodic braking pulses to correct a loss. This voltage is selected such that the braking force applied to the mechanical resonator can bring same to a halt, preferably quite quickly, and subsequently block same until the end of the correction period.

In an alternative embodiment, the electrical voltage applied to the piezoelectric strip 24 is variable during the correction period. For example, a higher voltage can be provided at the start of the correction period, which is selected in order to quickly bring the resonator to a halt, in particular during the alternation of the oscillation of this resonator in which the start of the correction period occurs, and the voltage can subsequently be reduced to a lower value that is nonetheless sufficient to keep the resonator at a halt. Advantageously, the electrical voltage is selected such that the resulting braking force cannot halt the mechanical resonator in the prohibited angular zone ($-\theta_{ZI}$ to $\theta_{ZI}$) defined hereinabove. For this purpose, the braking torque is selected such that it is strong enough to be able to bring the resonator to a halt and block same in the angular halted position, wherever that is, and small enough to prevent this braking torque from bringing the resonator to a halt in the prohibited angular zone. Preferably, the resonator is prevented from coming to a halt in the angular safety zone ($-\theta_{Sec}$ to $\theta_{Sec}$) described hereinabove. The aforementioned condition is important when the resonator is not self-starting. In general, it suffices to ensure that the resonator can start back up at the end of the correction period.

According to one specific alternative embodiment ensuring that the resonator is quickly brought to a halt outside the aforementioned angular safety zone, a preliminary phase is provided, which occurs before the correction period where the resonator is blocked (i.e. where it remains at a halt after being quickly or instantly brought thereto at the start of the correction period). During the preliminary phase, the first loss-correction mode available in the first embodiment is used. It is clear that in the synchronous phase of the first correction mode described hereinabove, the passage through an extreme angular position occurs during each braking pulse. Thus, the braking pulses are in phase with the passages of the mechanical resonator through one of the two extreme angular positions thereof, each of these passages defining the start of an alternation. This is taken advantage of by activating the frequency generator 62 during the preliminary phase, which is intended to have a relatively short duration but nonetheless sufficient for establishing a synchronous phase wherein the resonator is synchronised to the frequency $FS_{Cor}$. The preliminary phase ends, for example, during a final braking pulse which is immediately followed by the correction period with activation of the braking device in the blocking mode. The resonator is thus known to be blocked outside the angular safety zone. The braking torque for the preliminary phase can be different from that used to correct a loss as described hereinabove.

Since the behaviour of the frequency during the transitory phase at the start of a series of periodic braking pulses can vary on a case-by-case basis, the error generated by the preliminary phase is almost impossible to determine. However, a maximum error can be estimated. For example, if the frequency $F_{SUP}=1.05 \cdot F0c$ (correction of 30 seconds in 10 minutes) and the preliminary phase is provided with a duration of 10 seconds (selected duration greater than those of the transitory phases capable of taking place), the maximum error can be estimated to equal 0.5 seconds (half a second). For a mechanical movement, although such an error is not negligible, it is relatively small since a conventional mechanical movement has a daily error generally in the range 0 and 5 to 10 seconds.

With reference to FIG. 10, a second embodiment of a timepiece according to the invention will be described, which differs from the first embodiment by the arrangement of the blocking device advantageously allowing the second mode to be implemented for correcting a gain in the time display associated with the mechanical movement of the timepiece. This mechanical movement 92 comprises a conventional escapement 94 formed by a pallet-wheel 95 and a pallet-lever 96 capable of oscillating between two pegs 95. The pallet-lever comprises a fork 97 between the horns whereof is conventionally inserted at each alternation the pin 98 also forming the escapement and borne by a plate 100 which is integral with the staff 102 of the balance 104 (partially shown) of the mechanical resonator or formed integrally in one piece with this staff (i.e. the staff is machined with a longitudinal profile defining the plate). The plate 100 is circular and centred about the central axis of the staff 102 which defines the rotational axis of the balance 104.

The timepiece comprises a blocking device 106 which is separate from the braking device 22A (FIG. 1) used to correct a loss. This blocking device is thus dedicated to implementing the second gain-correction mode. The blocking device is formed by an electromechanical actuator, in particular by a piezoelectric actuator of the same type as that described with reference to FIG. 1. According to the alternative embodiment shown, the actuator comprises a flexible piezoelectric strip 24A and voltage is supplied to the two electrodes thereof by a power supply circuit 26A. The strip 24A has, at the free end thereof, a projecting part 107 forming a stud, which is situated on the plate 100 side. The strip extends in a direction parallel to a tangent of the circumference of the plate, at a short distance from this circular circumference. The plate has a through-cavity 108, which radially opens out onto the periphery of the plate, and the profile thereof in the general plane of the plate is provided so as to allow the stud 107 to be housed therein when situated angularly facing this cavity and when the piezoelectric actuator 106 is activated. According to the alternative embodiment shown, the cavity 108 is diametrically opposite the pin 98 and the stud is angularly situated in the zero position of the pin (i.e. the angular position of this pin when the resonator is at rest, respectively passes through the neutral position thereof). It should be noted that this zero angular position of the pin normally defines the zero angular position of the balance 104, and thus of the mechanical resonator, in a fixed angular frame of reference relative to the mechanical movement 92 and centred about the rotational axis of the balance.

In an equivalent alternative embodiment, the cavity can be arranged at another angle relative to the pin, for example at 90°, and the actuator 106 is thus positioned at the periphery of the plate such that the stud 107 is diametrically opposite the cavity when the resonator is at rest. Thus, regardless of the alternation and the angular position when the piezoelectric actuator is activated, the stud will enter the cavity when the resonator is in an angular position that is substantially equal, in absolute value form, to 180° (this being exactly the case if the balance is in phase, i.e. the pin is aligned with the respective centres of rotation of the balance and of the pallet-lever when the resonator is at rest). This value of 180° is clearly outside the safety zone (it is greater than the safety angle defined hereinabove) and it is generally lower than the range of the amplitudes of the mechanical resonator corresponding to the usable operating range thereof.

Furthermore, according to the advantageous alternative embodiment shown in FIG. 10, the sidewalls of the cavity 108 are parallel to the radius passing through the centre thereof and the rotational axis of the balance. In an equivalent alternative embodiment, these sidewalls are radial. Similarly, the stud 107 has two sidewalls, perpendicular to the general plane of the plate, which are parallel to the radius passing through the centre thereof and the rotational axis of the balance or which are, in the equivalent alternative embodiment, substantially radial relative to the rotational axis. Thanks to this arrangement, when the stud 107 is inserted into the cavity 108 which thus acts as a housing therefor, this stud blocks the rotation of the plate 100 and thus of the balance 104 via a substantially tangential force, the direction whereof is substantially parallel to the overall longitudinal direction of the piezoelectric strip 24A. When the actuator 106 is activated, the end of the strip bearing the stud 107 undergoes a substantially radial displacement, relative to the rotational axis of the balance, and the stud can thus, as a function of the angular position of the balance at this moment in time, either exert an essentially radial force on the circular lateral surface of the plate 100, or at least partially enter the cavity 108. The actuator must only be arranged such that the stud can undergo, when this actuator is activated, a sufficient displacement to be inserted into the cavity when the latter is located in an angular position corresponding substantially to that of the stud (in a fixed angular frame of reference relative to the stud).

A relatively low frictional force can be provided when the stud comes to bear against the circular lateral surface of the plate at the start of a correction period, i.e. after the activation of the actuator, in the case wherein the cavity is not facing the stud when the proximal surface thereof reaches the circular circumference of the plate. Thus, it can be guaranteed that the amplitude of the resonator does not reduce by much during the initial braking caused by the stud exerting a radial force against this circular lateral surface. Furthermore, when the stud is inserted into the cavity while the latter is located facing the stud, the radial force exerted by the piezoelectric strip on the plate can be very low or zero. The electrical energy required to block the resonator during the correction period can thus be relatively low, much lower than in the case of the first embodiment.

When the correction device of the timepiece receives an external correction signal corresponding to the correction of a gain detected in the display of the time, the control logic circuit thereof, in a manner similar to that of the operation of the first embodiment, activates the blocking device 106, by providing a control signal $S_{C2}$ thereto, similar to that described hereinabove within the scope of the first embodiment, for a period that is substantially equal to the time error to be corrected. Thanks to the arrangement of a cavity in a circular plate centred about the rotational axis of the resonator and an actuator having a corresponding part, however that is preferably narrower than the cavity, which is arranged such that it can undergo a substantially radial movement between a position of non-interaction, corresponding to a state in which it is not supplied by the actuator, and a state of interaction with the balance of the resonator, corresponding to a state in which it is supplied by the actuator in the alternative embodiment described here, the start of the activation of the blocking device 106 can take place at any time, regardless of the angular position of the resonator and regardless of the direction of the oscillatory motion (thus independently of the ongoing alternation from among the two alternations forming each oscillation period). This is highly advantageous.

Finally with reference to the second embodiment, the electromechanical actuator can be of a different type from that shown in FIG. 10. For example, in an alternative embodiment, the actuator can comprise a ferromagnetic or magnetised core which can be displaced under the effect of a magnetic field generated by a coil. In particular, this core is collinear with the coil and it comprises an end part exiting the coil at least when the actuator is activated, this end part forming a finger which is configured such that it can be inserted into the cavity of the plate, this finger in particular having a terminal part in the shape of the stud 107. In a preferred alternative embodiment, the actuator is a bistable actuator. The supply of the actuator is advantageously maintained, during the activation thereof to pass from the position of non-interaction to the position of interaction, until the stud enters at least partially the cavity 108. Such an alternative embodiment is of particular interest since the actuator must not exert any blocking force by applying a radial pressure on an element of the balance of the resonator in the two stable positions thereof respectively corresponding to the provided position of non-interaction and position of interaction. In this preferred alternative embodiment, the power consumption can be very low, regardless of the duration of the correction period, which is highly advantageous.

With reference to FIG. 11, a third embodiment of a timepiece according to the invention will be described, which essentially differs from the first embodiment by the arrangement of the blocking device advantageously allowing the second mode to be implemented for correcting a gain in the time display associated with the mechanical movement of the timepiece. The references already described with reference to FIGS. 1 and 2 will not be described in detail again here. Similarly to the second embodiment, the timepiece 112 according to the third embodiment comprises a blocking device 114 which is separate from the braking device 22B used to correct a loss. The braking device 22B is similar to the braking device 22A described hereinabove, and it operates in a similar manner, i.e. it is adapted to implement the first loss-correction mode described in detail hereinabove. This braking device 22B comprises a power supply 26B which is partially shared with that of the blocking device 114 and which receives the control signal $S_{C1}$. It then comprises a piezoelectric strip 24B in the shape of a bracket, this shape being provided here as a possible alternative and to allow the piezoelectric strip 24B and the piezoelectric strip 25, forming the blocking device, to be more easily arranged on the same surface of a support containing the shared supply 26B. However, other alternative embodiments can be provided, in particular a braking device identical to that shown in FIG. 1 with a power supply circuit that is completely separate from that of the blocking device.

The blocking device 114 is noteworthy for at least two reasons. Firstly, it acts on a conventional mechanical resonator 14 without requiring any modifications, in particular without requiring any specific machining, unlike for the second embodiment. Furthermore, the blocking device is a bistable element, i.e. a blocking element has two stable positions, namely in this case the lever 115. The blocking device is arranged such that a first of the two stable positions of the lever corresponds to a position of non-interaction with the balance 16 whereas the second of these two stable positions corresponds to a position for locking the resonator via a radial force exerted by a strip 116, forming the lever 115, on the felloe 20 of the balance. The strip 116 is pivoted about an axis arranged in the mechanical movement 4A (in another alternative embodiment, the lever is arranged such that the pivot axis thereof is arranged on a support that is separate from the mechanical movement and belonging to a correction module). In an alternative embodiment, this axis is formed by a fixed peg about which an annular terminal part of the strip 116 is mounted. This strip is rigid or semi-rigid, wherein mild flexibility can be advantageous.

The strip 116 is associated with a specific magnetic system procuring the bistable nature of the lever 115 and thus of the blocking device 114. The magnetic system comprises a first magnet 118, borne by the strip and thus fixed to this strip for rotation therewith, a second magnet 119 arranged in a fixed manner inside the mechanical movement or relative thereto, and a small ferromagnetic plate 120 arranged between the first magnet and the second magnet, at a fixed, short distance from the second magnet 119 or thereagainst (for example the small plate is bonded against this magnet, only a layer of adhesive thus separating the magnet from the small plate).

The first and second magnets 118, 119 have opposite magnetic polarities and the respective magnetic axes thereof are substantially aligned. Thus, in the absence of the small ferromagnetic plate, these two magnets would constantly exert a repulsion force on one another and the lever would remain in or always return to, in the absence of forces external to the magnetic system, a position wherein the strip is in abutment against a peg 124 limiting the rotation thereof. However, thanks to the arrangement of the small ferromagnetic plate, the magnetic force exerted between the two magnets is reversed. More specifically, when the moving magnet 118 is moved closer from the remote position thereof (shown in FIG. 11), the repulsion force decreases until it is cancelled out and ultimately reversed when the moving magnet moves close to the small ferromagnetic plate. Thus, when the moving magnet 118 is situated very close or against the small ferromagnetic plate 120, this moving magnet is subjected to a magnetic attraction force. This surprising physical phenomenon is described in detail in the Swiss patent application CH 711 889, which further contains several horological applications.

The lever 114 is arranged to take two stable positions in the absence of forces external to the magnetic system of the blocking device. The first stable position is a position of non-interaction, wherein the strip 116 is in abutment against the peg 124, the moving magnet 118 thus being subjected to a magnetic repulsion force which maintains the lever against this peg. The second stable position is a position of interaction, wherein the strip 116 is in abutment against the felloe 20 of the balance 16, the moving magnet 118 thus being subjected to a magnetic attraction force which maintains the lever against this felloe. The small ferromagnetic plate 120 is arranged such that the strip exerts a radial force blocking the balance 16, and thus the resonator 14, when the lever is in the second stable position thereof. In order for the strip to exert a blocking force against the outer lateral surface of the felloe 20, the surface of the small plate 120 situated facing the moving magnet 118 must be slightly withdrawn relative to the proximal surface of this moving magnet when the strip 116 comes into contact with the felloe. If the strip is semi-rigid and thus has a certain flexibility, the moving magnet can ultimately abut against the proximal surface of the small ferromagnetic plate, however in this case the strip is under bending.

In order to displace the bistable lever 115 between the two stable positions thereof, in both directions, the blocking device comprises a device for actuating this lever. This actuation device 126 is controlled by the logic circuit of the electronic control unit via the power supply circuit thereof which receives the control signal $S_{C2}$. It is noteworthy in that the blocking force exerted by the blocking device does not originate from an electrical power supply to this blocking device, but from the magnetic system forming it. Thus, the blocking device only requires electrical power at the start and at the end of the blocking period for the second gain-correction mode, during the switching of the bistable lever between the two stable states thereof.

For the purposes of illustration only, the actuation device 126 is formed by a piezoelectric device comprising a piezoelectric strip 25 that can be bent in both directions from the rest position (non-activated position) thereof, by the application of an electrical voltage, supplied by the power supply circuit 26B, between the two electrodes thereof with positive and negative electrical polarity respectively. The lever 115 comprises a fork 122 defining a cavity inside which the free end of the piezoelectric strip 25 is housed. The width of the cavity is preferably provided such that it is greater than the width of the free end of the strip 25 and this strip is arranged such that it is against a first sidewall of the cavity when the bistable lever is in the first stable position thereof and against the second sidewall of this cavity when the bistable lever is in the second stable position thereof. By adjusting the width of the cavity, the piezoelectric strip 25 can be made substantially straight, i.e. with no bending, in the two stable positions of the lever. However, a slight residual bending as shown, in the absence of voltage applied by the power supply, can be provided for and can be advantageous given the path to be travelled by the end of the piezoelectric strip.

In one advantageous alternative embodiment, the actuation device of the lever is formed by an electromagnetic magnet-coil system, the magnet being in particular fastened to the lever and the coil is fastened to the lever support in substantial alignment with the magnet. Depending on the polarity of the electrical voltage applied to the coil, the lever is subjected to a magnetic attraction or repulsion force, thus allowing the lever to easily pass from one of the two stable positions thereof into the other in both directions.

In another alternative embodiment resulting in the same physical phenomenon and thus the same sought-after effect, the small ferromagnetic plate 120 is arranged against the moving magnet 118, with which it is rigidly connected. Finally, another alternative embodiment provides for combining the second and third embodiments. For this purpose, the strip of the lever comprises, in the region in which contact is made with the felloe 20, a stud which projects towards this felloe, which has a cavity along the overall circular circumference thereof. A person skilled in the art will know how to arrange the blocking device such that the first stable position thereof is a position of non-interaction and the second stable position thereof is a position of interaction wherein the stud is at least partially inserted into the cavity, this stud generally exerting initially a dynamic dry friction against the outer lateral surface of the felloe, when the lever is actuated by the actuation device to pass from the first stable position thereof into the second stable position thereof at the start of a gain-correction period, before penetrating the cavity when the latter is presented facing the stud during the oscillation of the balance.

Figure 12:
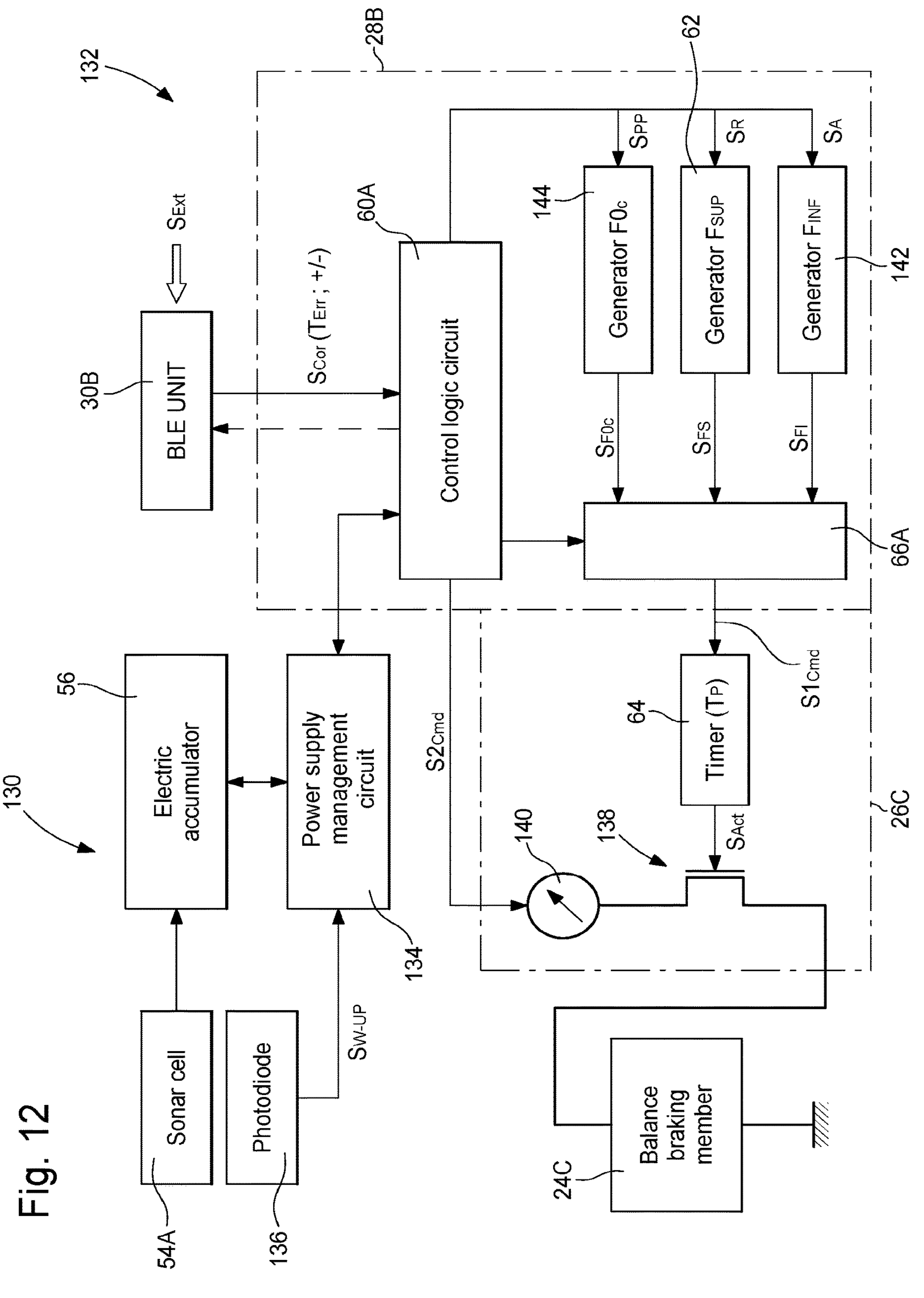
FIG. 12 schematically shows a fourth embodiment of a timepiece according to the invention.

A fourth embodiment of a timepiece is described herein below with reference to FIGS. 1 and 12. This fourth embodiment is a preferred embodiment which differs from the first embodiment substantially as a result of the gain-correction mode and a few enhancements and alternatives of certain units of the correction device 132.

Firstly, the receiver unit 30B of the correction device is a BLE (Bluetooth Low Energy) unit. Secondly, the power supply 130 to the correction device is more advanced than in the alternative shown for the first embodiment (FIG. 2). The energy harvester is a solar cell 54A, in particular arranged at the dial or the bezel bearing the glass protecting the dial. This dial generally forms a part of the time display. Furthermore, a photodiode 136 is provided to receive a light signal for activating the correction device provided by the external electronic device, in particular the mobile phone 40, to initiate/start, in the timepiece, a cycle for correcting the displayed time on the basis of an external correction signal $S_{Ext}$ subsequently provided by the external electronic device (in other words to start the method for correcting the time displayed which is implemented in the correction device 132).

The electrical power supply 130 comprises a circuit 134 for managing the power supply to the correction device 132. This circuit is capable of receiving various information from the electric accumulator 56 and it receives, from the photodiode 136, a wake-up signal $S_{W\text{-}UP}$ when this photodiode receives a specific light signal from the mobile phone 40. Various measures known to a person skilled in the art can be taken to prevent the photodiode from sending unwanted wake-up signals to the correction device. In particular, a specific narrow frequency band can be selected. Moreover, the light signal can be encoded, in particular by modulating the light intensity thereof, and the photodiode 136 or the management circuit 134 is thus arranged to be able to determine whether the logic code corresponding to this modulation actually relates to an intended wake-up signal. Once the management circuit 134 has received a valid wake-up signal, it detects the energy level available in the accumulator 56. Similarly to the first embodiment, if the energy level is insufficient to complete the correction method, the management circuit can react in various ways. In particular, it can wake up the BLE unit and send a message to the mobile phone via this BLE unit so that this external device gives this information to the user via the electronic display thereof. It can then either remain on standby pending an electrical energy supply via the solar cell thereof or other energy harvesting means also provided, or start, insofar as possible, a correction cycle knowing that there is a risk it cannot correctly complete the cycle due to the available energy being insufficient.

When the available energy level is sufficient for a correction cycle, the management circuit 134 activates, in a first alternative embodiment, firstly the BLE unit pending an external correction signal $S_{Ext}$. The BLE unit typically has the resources to check whether an external signal received at the correct frequency is in the standard format, but the control logic circuit 60A may need to be activated to analyse a signal received by the BLE unit if that signal is received at the correct frequency and has the correct format. In the latter case, it is the analysis of the digital correction signal $S_{Cor}$ that will indicate, where necessary, that the signal received is not appropriate or is incomplete. Thus, in a second alternative embodiment, the management circuit directly activates the BLE unit and the control logic circuit, but preferably not the other elements of the correction device. If no correction signal is received or received correctly, the management circuit 134 can, in an alternative embodiment, inform the mobile phone thereof (directly or via the control logic circuit 60A, the latter thus having to be activated to do so), and either wait for a new external correction signal within an additional time period, or return to a 'Standby' mode pending a new wake-up signal. In another alternative embodiment where the timepiece comprises an electronic or electromechanical means for giving a visible signal to the user, the management circuit 134 can thus use this means to itself notify the user that it is not able to carry out a correction, because it is not receiving or not correctly receiving the external correction signal.

In the first alternative embodiment mentioned hereinabove, when the BLE unit receives an external correction signal $S_{Ext}$ at the correct frequency and in the correct format, it activates at least the control logic circuit 60A to which it supplies the digital correction signal for analysis and continuation of a correction cycle. If the digital signal $S_{Cor}$ comprises the expected time information, in particular the time error $T_{Err}$ to be corrected and the mathematical sign '+/−' thereof indicating whether a loss or a gain is to be corrected (since this last information item is binary, a single bit can be provided for this purpose), the management circuit 134 activates the entire correction device and the power supply circuit 26C of the braking device.

Since the fourth embodiment is characterised by an implementation of the first loss-correction mode, similarly to the first embodiment, and of the first gain-correction mode described hereinabove but not implemented in the first embodiment, any correction provided for is carried out by a series of periodic braking pulses during a correction period. One main alternative embodiment provides for all of the braking pulses having the same duration Tp. Thus, only one timer 64 is required to determine the duration of the braking pulses and this timer is arranged, in the alternative embodiment shown in FIG. 12, in the power supply circuit 26C. This timer provides an activation/actuation signal $S_{Act}$ to a switch 138 placed between a voltage source 140 and the braking member 24C acting on the balance. The braking member 24C is, for example, similar to the piezoelectric strip (FIG. 1) of the alternative embodiment shown for the first embodiment. Thus, the switch 138 controls the power supply to the actuator forming the braking device. The timer 64 receives a first control signal $S1_{Cmd}$ from a switching device 66A which is controlled by the logic circuit 60A such that the first control signal is selectively formed by a periodic digital signal from among three periodic digital signals provided $S_{FS}$, $S_{FI}$ and $S_{F0c}$ which respectively have three different frequencies $F_{SUP}$, $F_{INF}$ and F0c. The periodic digital signal periodically resets the timer to the selected frequency and, in response, this timer periodically activates the actuator for a duration Tp, by momentarily making the switch 138 conducting, to generate a series of periodic braking pulses at this selected frequency.

When the digital correction signal indicates that a time error corresponds to a loss to be corrected or that the control logic circuit has itself determined such a time error to be corrected on the basis of the information contained in the external correction signal, the logic circuit 60A determines, as a function of the selected frequency $F_{SUP}$, a corresponding correction period $PR_{Cor}$ or a number of periodic braking pulses to be generated at the frequency $F_{SUP}$ during the current correction cycle. To achieve this, it uses the formula regarding this calculation described hereinabove. To apply the series of braking pulses at the frequency $F_{SUP}$ resulting in a correction frequency $FS_{Cor}$ that is greater than the setpoint frequency, it uses the frequency generator 62, described hereinabove, which provides a periodic digital signal $S_{FS}$ at the frequency $F_{SUP}$ to the timer 64 via the switch 66A, which is controlled for this purpose by the control logic circuit.

When the digital correction signal indicates that a time error corresponds to a gain to be corrected or that the control logic circuit has itself determined such a time error to be corrected on the basis of the information contained in the external correction signal, the logic circuit 60A determines, as a function of the selected frequency $F_{INF}$, a corresponding correction period $PA_{Cor}$ or a number of periodic braking pulses to be generated at a frequency $F_{INF}$, defined hereinabove, during the current correction cycle. To achieve this, it uses the formula regarding this calculation described hereinabove. To apply the series of braking pulses at the frequency $F_{INF}$ resulting in a correction frequency $FI_{Cor}$ that is less than the setpoint frequency, it uses the frequency generator 142 which provides a periodic digital signal SF' at the frequency $F_{INF}$ to the timer 64 via the switch 66A, which is controlled for this purpose by the control logic circuit.

In general, to allow for the implementation of the first gain-correction mode, the electronic control unit 28B is arranged such that it can provide the braking device, when the external correction signal received by the receiver unit corresponds to a gain in the time displayed that is to be corrected, with a control signal derived from a periodic digital signal provided by a frequency generator at a frequency $F_{INF}$, during a correction period, to activate the braking device such that it generates a series of periodic braking pulses applied to the mechanical resonator at the frequency $F_{INF}$. This frequency $F_{INF}$ is provided and the braking device is arranged such that the series of periodic braking pulses at the frequency $F_{INF}$ can, during the correction period, result in a synchronous phase wherein the oscillation of the mechanical resonator is synchronised to a correction frequency $FI_{Cor}$ which is less than the setpoint frequency F0c provided for the mechanical resonator. The (duration of the) correction period and thus the number of periodic braking pulses in said series of periodic braking pulses are determined by the gain to be corrected.

The correction device of the fourth embodiment comprises an enhancement to increase the precision of the correction carried out and also allow relatively high braking torques to be applied, in particular for corrections at frequencies that are relatively far from the setpoint frequency, without the risk of sustainably halting the mechanical resonator by bringing same to a halt, during a braking pulse at the start of the correction period, within the angular coupling zone of the resonator with the escapement, or generally within the angular safety zone described hereinabove. According to this enhancement, the timepiece comprises a device for determining the passage of the oscillating mechanical resonator through at least one specific position, this device for determining a specific position of the mechanical resonator allowing the electronic control unit to determine a specific moment at which the oscillating mechanical resonator is located in said specific position, and thus to determine the phase of the resonator. Furthermore, the electronic control unit is arranged such that a first activation of the braking device occurring at the start of the correction period, to produce a first interaction between this braking device and the mechanical resonator, is initiated as a function of said specific moment.

According to an advantageous alternative embodiment of the enhancement described hereinabove and with reference to FIG. 12, the correction device further comprises a frequency generator 144 which is arranged such that it can generate a periodic digital signal $S_{F0c}$ at the setpoint frequency F0c provided for the resonator. The electronic control unit 28B is arranged such that it can provide the braking device with a control signal derived from the periodic digital signal $S_{F0c}$, during a preliminary period directly preceding the correction period, to activate the braking device such that this braking device generates a preliminary series of periodic braking pulses which are applied to the mechanical resonator at the setpoint frequency F0c. For this purpose, the control logic circuit 60A provides the generator 144 with a control signal $S_{PP}$. The duration Tp of the periodic braking pulses and the braking force applied to the oscillating resonator, during the preliminary series of periodic braking pulses, are provided such that none of these braking pulses can bring the oscillating resonator to a halt in the coupling zone of this oscillating resonator with the escapement associated therewith (between $-\theta_{ZI}$ and $\theta_{ZI}$) or, preferably, in a predefined safety zone (between $-\theta_{Sec}$ and $\theta_{Sec}$) covering the coupling zone (these zones are described hereinabove).

Furthermore, the duration of the preliminary period and the braking force applied to the oscillating resonator, during the preliminary series of periodic braking pulses, are provided so as to produce, at least at the end of the preliminary period, a preliminary synchronous phase wherein the oscillation of the mechanical resonator is synchronised (on average) to the setpoint frequency F0c. In the alternative embodiment shown, the electrical voltage source 140 is variable and controlled by the logic circuit 60A which provides it with a control signal $S2_{Cmd}$, such that the voltage level applied to the braking member 24C can be varied in order to vary the braking force. A braking force can thus be applied during the preliminary period that is weaker than that applied during a following correction period. The braking force can also be varied during the preliminary period and/or the correction period.

The correction period intended to correct a gain or a loss directly follows the preliminary period. More specifically, the initiation of a first braking pulse at the frequency $F_{INF}$ or $F_{SUP}$, at the start of a period for correcting the time displayed, occurs after a time interval determined relative to a moment at which the last braking pulse of the preliminary period was initiated, such that this first braking pulse occurs outside a predefined safety zone covering the aforementioned coupling zone. This condition is easily met since the resonator is in a synchronous phase at least at the end of the preliminary period, which consequently means that the resonator comes to a halt during the last braking pulse of this preliminary period. Thus, a reversion of the direction of rotation occurs during said last braking pulse such that the start of a new alternation of the oscillation of the resonator occurs during this last braking pulse. The correction device can thus know the oscillation phase with a precision of Tp/2 (for example a precision of 3 ms). As a result, the electronic control unit can be arranged such that the control logic circuit can determine an initial moment for initiating the first braking pulse which meets the aforementioned condition, by activating the frequency generator 62 or 142, depending on the required correction, after a determined time interval has passed since said last braking pulse which ensures that the first braking pulse is outside the predefined safety zone.

Moreover, the moment at which said first braking pulse is initiated and the braking force applied to the oscillating resonator, during this first pulse, and subsequently during following periodic braking pulses during the correction period, are provided such that the synchronous phase at the correction frequency $FI_{Cor}$ or $FS_{Cor}$ preferably starts as soon as the first braking pulse is applied, or as soon as a second braking pulse is applied if the first braking pulse is intended to reduce the amplitude of the oscillation without managing to bring the resonator to a halt, and such that this synchronous phase lasts throughout the entire duration of the correction period. In a specific alternative embodiment, the first braking pulse of the correction period occurs after a time interval corresponding to the inverse of the frequency $F_{SUP}$ or $F_{INF}$, depending on the required correction, after the moment at which the last braking pulse of the preliminary period occurs. In another specific alternative embodiment, said time interval is selected such that it is equal to the inverse of double the correction frequency $FS_{Cor}$ or $FI_{Cor}$, depending on the required correction, or to the inverse of this frequency $FS_{Cor}$ or $FI_{Cor}$. The enhancement described hereinabove is noteworthy in that it uses available resources, in particular the braking device provided for carrying out the required correction, to determine the oscillation phase of the resonator. No specific sensor is required to determine this phase. Moreover, no significant time drift is induced by the preliminary period (generally T0c/4 maximum). It can be seen that the generators at the various frequencies have been shown in a separate manner in FIG. 12, however a single programmable frequency-generating device can be used.

Figure 13:
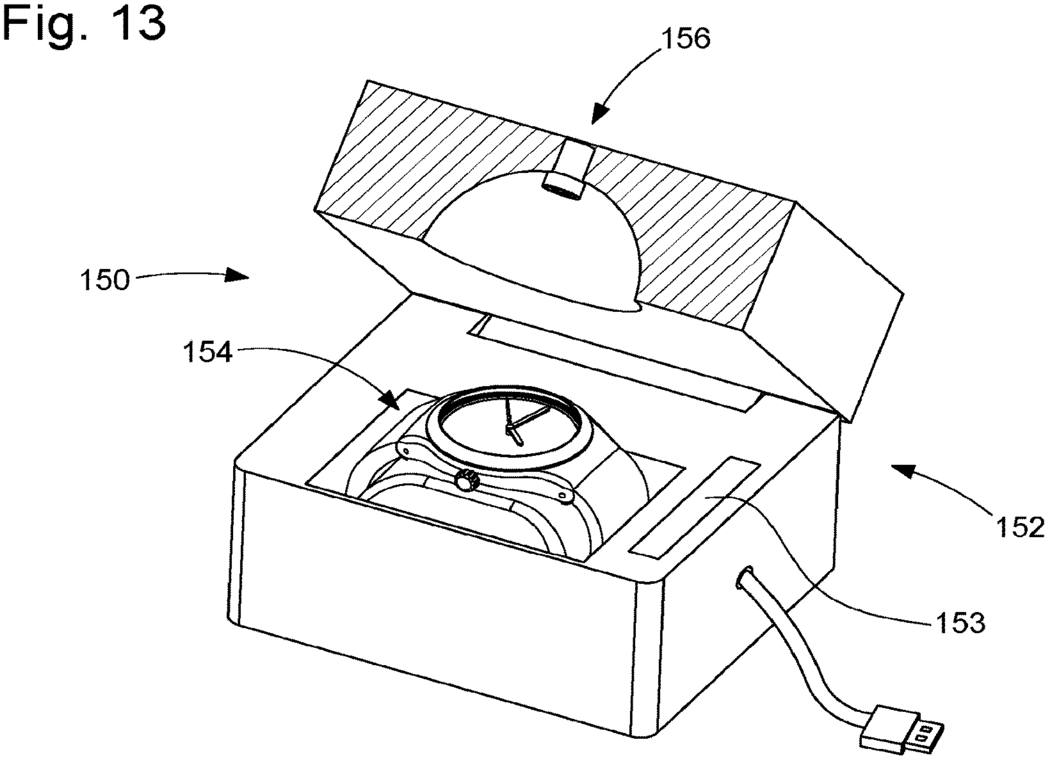
FIG. 13 shows a second embodiment of an assembly according to the invention comprising a timepiece according to the invention and an external electronic device, according to a second embodiment, serving as a box and charging station for the timepiece.
Figure 14:
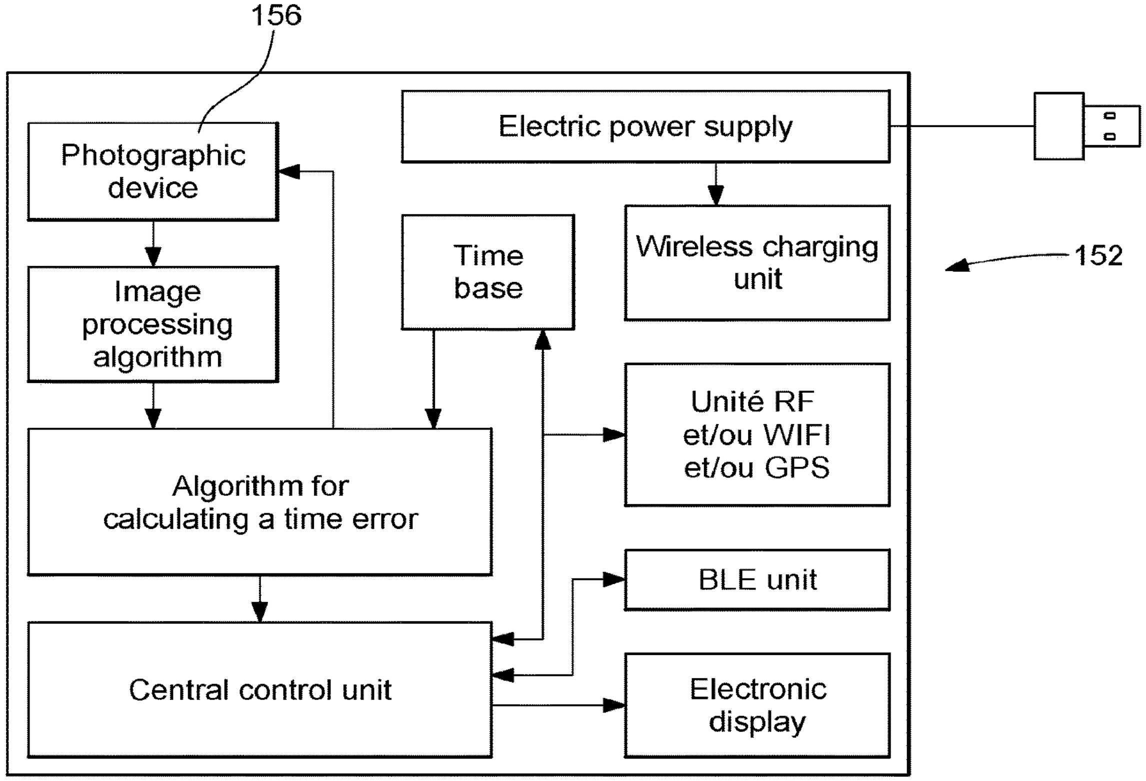
FIG. 14 schematically shows the arrangement of electronic elements and of functional units in the external electronic device of the second embodiment.
Figure 15:
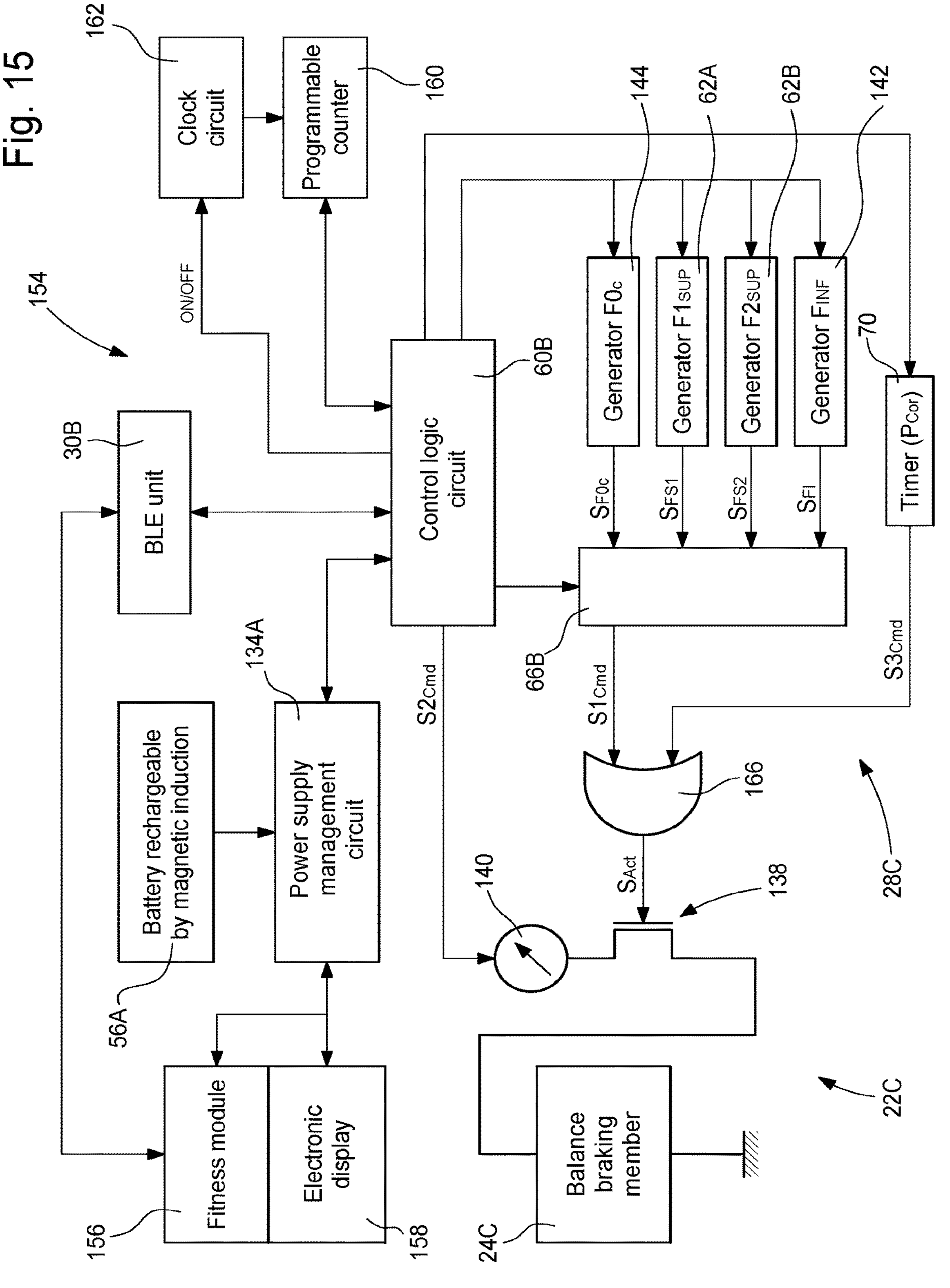
FIG. 15 schematically shows a fifth embodiment of a timepiece according to the invention, which can form the assembly according to the second embodiment.

With reference to FIGS. 13 to 15, a second embodiment of an assembly 150 according to the invention will be described herein below, which comprises a timepiece 154 according to a fifth embodiment and an external device 152 according to a second embodiment of an assembly according to the invention. The timepiece is a wristwatch (hereinafter referred to as the watch) and the external device forms a box comprising a recess for receiving the watch in a given position. The box 152 is provided with a photographic device 156 arranged in the lid of the box so as to be able to capture an image of the entire display of the timepiece when the lid is closed with the timepiece 154 correctly placed in the recess.

The box 152 is provided with various electronic circuits and units. This box comprises:

- a photographic device comprising a photographic sensor formed by an array of photodetectors,
- an image processing algorithm which is arranged to be able to determine the position of at least one determined hand of the display of the timepiece in an image captured by the photographic device (it should be noted that this algorithm can be processed in an external server communicating with the box),
- a time base capable of supplying the precise actual time,
- an algorithm for calculating a time error between a first time datum, indicated by the display at a given moment in time and detected by the external device via the photographic sensor thereof and the image processing algorithm thereof, and a second time datum corresponding to the first time datum and supplied substantially at said given moment in time by the time base,
- a transmitter transmitting an external correction signal comprising information relating to said time error, which transmitter is formed by a BLE unit in the alternative embodiment shown.

The box 152 further comprises an electronic display 153, a central control unit and, in order to be able to receive the precise actual time regularly or on demand, a communication unit (RF unit) capable of receiving the precise actual time via an antenna provided for this purpose (radio synchronisation), or a WIFI unit for receiving the precise actual time via the Internet, or a GPS unit. The box further comprises a power supply that can be powered or charged via a USB-type plug or other plug. Finally, the box comprises a wireless, magnetic induction charging unit for the watch 154 which comprises in particular a Fitness module. This wireless charging unit is preferably arranged in a support inserted into the recess of the box so as to be close to the watch and beneath it when it is placed in the box, in particular to allow the battery 56A thereof to be charged.

The watch 154 comprises various electronic circuits and elements. The references already described hereinabove will not be described in detail again here. This watch comprises a BLE unit 30B for receiving various signals, including in particular a signal for correcting the time displayed by the watch, as well as a braking device 22C, the component elements whereof have already been described hereinabove, which receives an activation signal $S_{Act}$ from the electronic control unit, which will be described herein below. The watch 154 then comprises a rechargeable battery 56A, that is preferably recharged by magnetic induction (by a contactless means), and a power management circuit 134A, similar to that described hereinabove with reference to the watch in FIG. 12. Optionally, the watch further comprises a Fitness module 156 and an electronic display 158 associated in particular with the Fitness module, which can use the BLE unit to communicate with electronic devices external to the watch, in particular with the box 152, a mobile phone or any other appropriate electronic device, for example a computer.

The electronic control unit 28C of the watch 154 is arranged to allow the first loss-correction mode to be implemented, according to an enhanced alternative embodiment, and to allow a gain to be corrected according to the first correction mode or the second correction mode described hereinabove. Thus, this electronic control unit comprises a control logic circuit 60B that controls a switching device 66B in parallel with a frequency-generating device at frequencies F0c, $F_{INF}$ and $F1_{SUP}$ and $F2_{SUP}$. $F1_{SUP}$ and $F2_{SUP}$ are two different values selected for the frequency $F_{SUP}$ defined hereinabove. This frequency-generating device is composed of a generator 144 at the frequency F0c, for implementing a preliminary period already described within the scope of the fourth embodiment of a timepiece according to the invention, of a generator 142 at the frequency $F_{INF}$ also described within the scope of the fourth embodiment, and of two generators 62A and 62B respectively supplying two periodic digital signals $S_{FS1}$ and $S_{FS2}$ having respective frequencies $F1_{SUP}$ and $F2_{SUP}$. In other words, the frequency-generating device is arranged so as to be able to generate, in order to correct a loss in the time displayed, a periodic digital signal selectively at the frequency $F1_{SUP}$ and at the frequency $F2_{SUP}$ to Control the Braking Device. The Frequencies $F1_{SUP}$ and $F2_{SUP}$ are provided such that the correction frequency $FS_{Cor}$ for correcting a loss according to the first correction mode can take two different values $F1_{Cor}$ and $F2_{Cor}$, respectively for the two frequencies $F1_{SUP}$ and $F2_{SUP}$, with the correction frequency $F2_{Cor}$ being higher than the correction frequency $F1_{Cor}$.

The frequency $F1_{SUP}$ is advantageously selected when the loss to be corrected, in absolute value form, is lower than a given value, whereas the frequency $F2_{SUP}$ is Selected when this Loss is Greater than or Equal to this given value. The frequency $F_{SUP}$ can thus take at least two different values $F1_{SUP}$ and $F2_{SUP}$ as a function of the value of the loss to be corrected. Depending on the generator activated, the control signal $S1_{Cmd}$ is formed by one of the periodic digital signals $S_{F0c}$, $S_{FI}$, $S_{FS1}$, and $S_{FS2}$. This signal $S1_{Cmd}$ itself directly forms the activation signal $S_{Act}$. It can be seen that no timer is provided for determining the duration of the braking pulses because, in this alternative embodiment, the periodic digital signals $S_{F0c}$, $S_{FI}$, $S_{FS1}$ et $S_{FS2}$ are intended to define this duration by the duty cycle thereof determined between their logic-high ('1') and their logic-low ('0'). Thus, for example, the duration of the logic-high determines the duration of each braking pulse, with the switch 138 being closed (transistor on) at the rising edges of the periodic digital signal supplied and being open (transistor off) at the falling edges of this periodic digital signal.

Moreover, the electronic control unit 28C comprises a timer 70, similar to that described with reference to FIG. 2, to allow the second correction mode already described in the first embodiment of a watch according to the invention to be implemented. This timer 70 provides a control signal $S3_{Cmd}$ to activate the braking device via an 'OR' logic gate 166 further receiving the control signal $S1_{Cmd}$ (it can be seen that the switch operated by the logic gate can be incorporated into the switch 66B, making this logic gate introduced in the diagram of FIG. 15 superfluous for differentiating between the first correction mode and the second correction mode). Thus, either the first correction mode or the second correction mode can be selected to correct a gain.

Selecting the first correction mode is advantageous when the gain to be corrected is less than a given value, whereas the second correction mode is selected when the gain to be corrected is greater than or equal to this given value. As the first gain-correction mode allows less electrical energy to be consumed compared to the second correction mode with a braking device of the electromechanical actuator type having a single stable position in the absence of power (for example the piezoelectric actuator 22A in FIG. 1), the selection of the first or second correction mode can also depend on the level of the rechargeable battery 56A. Similarly, since the first loss-correction mode a priori requires a stronger braking torque in the case of a relatively high ratio between the correction frequency and the setpoint frequency, the selection of the generator 62A or the generator 62B can also depend on the level of the rechargeable battery.

The fifth embodiment of a timepiece comprises means for correcting not only an error in the time displayed, resulting from a time drift of the oscillating resonator or from an imprecise manual time setting operation, but also for allowing the displayed time to be changed at the appropriate moment during a seasonal time change (change from standard time to daylight saving time and vice-versa). To this end, the watch 154 comprises an internal clock circuit 162 and a programmable counter 160. The application installed on an external device (box 152 or a mobile phone 40 in FIG. 1), in order to be able to communicate with the watch and activate the correction device thereof, comprises the 'seasonal time change' function to program the watch 154 such that it goes forward one hour or backward one hour (or half an hour, where appropriate) on the night of the scheduled time change. For this purpose, the external device is arranged to be able to send a correction signal relating to the seasonal time change to the watch via its transmitter, which is provided for communication with this watch. This correction signal comprises the scheduled time jump and the direction thereof (+/−1 hour), as well as an indication of the remaining period of time until the scheduled night and time for the time change (for example a period of 15 days, 8 hours and 20 minutes). Thus, the external device comprises the resources required to know not only the precise actual time but also the date. Based on the date at the moment in time when the 'seasonal time change' function is activated, the application easily calculates the aforementioned remaining period of time.

When the watch 154 receives the external correction signal with the indication that this signal relates to an upcoming time change, the control logic circuit 60B programs the counter 160 so that it measures the remaining period of time, upon receipt of a reset signal from the logic circuit, until the scheduled time change. Alternatively, the start of the time measurement takes place as soon as the clock circuit 162 is activated by the logic circuit after the counter has been programmed, this activation taking place quickly after receipt of the external correction signal. In order to carry out the seasonal time change on the scheduled night, the watch 154 can take advantage of the fact that it can be recharged by the charging unit in the box 152. More specifically, as the time change is typically scheduled to take place at night, after midnight, the user can place the watch in the box on the night in question and activate the recharging of the watch battery (unless this takes place automatically). This ensures that the watch has enough energy to make the relatively long time correction. For such a correction, the watch will select either the second gain-correction mode by activating the timer 70, after having provided it with the DURATION OF THE CORRECTION PERIOD $PA_{COR}$, OR THE GENERATOR $F2_{SUP}$ BY ACTIVATING IT for a correction period $PR_{Cor}$ calculated for a loss corresponding to the '1 hour' jump. For example, the ratio RS=F2Cor/F0c is provided such that it is greater than 1.10 and preferably greater than 1.15. As indicated hereinabove, the first loss-correction mode allows, for example, 1 hour to be corrected in a 6-hour correction period. It is even possible to correct 1 hour in 5 hours.

It should be noted that the braking device can be formed by an actuator of a different type to that described hereinabove, in particular by an actuator of the electromagnetic type comprising a magnet-coil coupling system provided for directly braking the mechanical resonator, at least one magnet being fastened to the balance of the resonator or to the support thereof and at least one coil being respectively carried by this support or by the balance of the resonator.

A sixth embodiment of a timepiece according to the invention is described herein below with reference to FIGS. 16 to 18. This sixth embodiment is arranged to allow the second gain-correction mode, described hereinabove in the preceding embodiments, to be implemented, in addition to a second loss-correction mode which will be described here in more detail.

Figure 16:
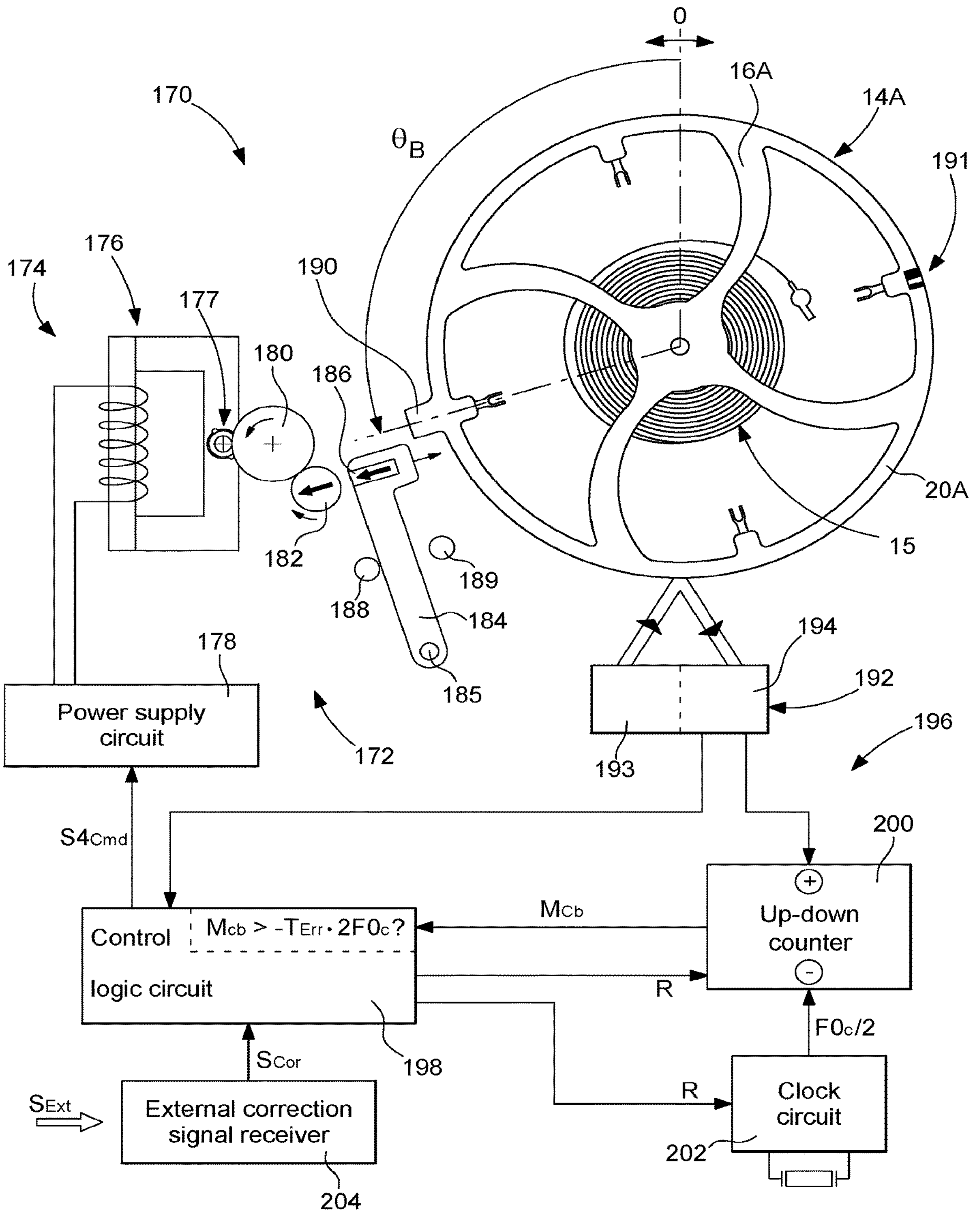
FIG. 16 shows a partially schematic view of a sixth embodiment of a timepiece according to the invention.

The timepiece 170 according to the sixth embodiment is partially illustrated in FIG. 16, where only the mechanical resonator 14A of the mechanical movement is shown. With the exception of the device for correcting the time displayed, the other elements of the timepiece are similar to those shown in FIG. 1. The mechanical resonator comprises a balance 16A associated with a balance-spring 15. The balance comprises a felloe 20A which has a projecting part 190 extending radially at the periphery thereof. No other element of the balance extends as far as the radial position of the end part of the projecting part 190.

The balance comprises a mark 191 formed by a non-symmetrical succession of bars having different light reflection coefficients for light originating from an optical sensor 192 or simply a different reflection of this light, in particular a succession of at least two black bars of different widths and separated by a white bar, the width of one of the two black bars being equal to the sum of the widths of the other black bar with the white bar. It is understood that the bars thus form a sort of code with a transition in the middle of the mark 191. Instead of black bars and a white bar, other colours can be used. In an alternative embodiment, the black bars correspond to matte zones of the felloe, whereas the white bar corresponds to a glossy zone of this felloe. The black bars can also correspond to notches in the felloe that have an inclined plane. A plurality of alternative embodiments are thus possible. It should be noted that the mark 191 has been shown on the top of the felloe for the description thereof, however in the alternative embodiment illustrated, it is situated on the outer lateral surface of the felloe since the optical sensor is arranged in the general plane of the balance 16A. In another alternative embodiment, the mark is situated as shown, on the top or bottom surface of the felloe, and the sensor is thus pivoted 90° in order to illuminate this mark.

The optical sensor 192 is arranged to detect the passages of the oscillating resonator through the neutral position thereof (corresponding to the angular position '0' for the projecting part 190) and to allow the direction of motion of the balance to be determined during each passage through this neutral position. This optical sensor comprises an emitter 193 emitting a light beam towards the felloe 20A, this emitter being arranged such that it illuminates the mark 191 when the resonator passes through the neutral position thereof, and a light receiver 194 arranged to receive at least part of the light beam that is reflected by the felloe at the mark. The optical sensor thus forms a device for detecting a specific angular position of the balance, allowing the electronic control unit to determine a specific moment at which the oscillating mechanical resonator is located in the specific angular position, and also a device for determining the direction of motion of the balance during the passage of the oscillating resonator through the specific angular position.

Other types of detectors for detecting the position and direction of motion of the resonator can be provided in other alternative embodiments, in particular capacitive or inductive detectors.

Furthermore, the timepiece 170 comprises a device for braking the resonator which is formed by an electromechanical device 174 having a bistable, moving abutment. An alternative embodiment is provided as a non-limiting example in FIG. 16. The electromechanical device 174 comprises an electromechanical motor 176, of the horological stepping motor type having small dimensions, which is powered by a power supply circuit 178, which comprises a control circuit arranged to produce, when it receives a control signal $S4_{Cmd}$, a series of three electrical pulses which are provided to the coil of the motor such that the rotor 177 thereof advances by one step at each electrical pulse, i.e. by half a revolution. The series of three electrical pulses is provided to quickly drive the rotor, in a continuous or near-continuous manner. The pinion of the rotor meshes with an intermediate wheel 180 which meshes with a wheel having a diameter that is equal to three times that of the pinion of the rotor and fixedly bearing a first bipolar permanent magnet 182. Given the diameter ratio between said pinion and the wheel bearing the magnet 182, the latter revolves by half a revolution during a series of three electrical pulses. Thus, the first magnet has a first rest position and a second rest position wherein the first magnet has a magnetic polarity that is opposite that of the first rest position (the term 'rest position' is understood to mean a position in which the magnet 182 is located after the motor 176 has carried out, as instructed, a series of three electrical pulses and after the rotor thereof has then ceased to revolve).

Moreover, the actuator 174 comprises a bistable lever 184 pivoted about an arbor 185 fastened to the mechanical movement and limited in the rotation thereof by two pegs 188 and 189. The bistable lever comprises, at the free end thereof, forming the head of this lever, a second bipolar permanent magnet 186 which is capable of moving and substantially aligned with the first magnet 182, the magnetic axes of these two magnets being provided such that they are substantially collinear when the first magnet is in either of the two rest positions thereof. Thus, the first rest position of the first magnet corresponds, relative to the second magnet 186, to a position of magnetic attraction, and the second rest position thereof corresponds to a position of magnetic repulsion. Each time the control signal $S4_{Cmd}$ activates the power supply circuit so as to carry out a series of three electrical pulses, the first magnet rotates half a turn and the lever alternately passes from a stable position of non-interaction with the balance of the resonator to a stable position of interaction with this balance wherein the lever 184 thus forms an abutment for the projecting part 190, which abuts against the head of this lever when the resonator oscillates and when the projecting part reaches this head, regardless of the direction of rotation of the balance at the time of impact.

In the position of non-interaction, the moving lever is outside a space crossed by the projecting part 190 when the resonator oscillates with an amplitude in the usable operating range thereof. However, in the position of interaction, the moving lever is located partially inside this space crossed by the projecting part and thus forms an abutment for the resonator. The term 'stable position' is understood to mean a position in which the lever remains in the absence of any power supply from the motor 176 which is used to actuate the lever between the two stable positions thereof, in both directions. The lever thus forms a bistable moving abutment for the resonator. This lever thus forms a retractable stop member for the resonator. The actuator 174 is arranged such that the lever can remain in the position of non-interaction and in the position of interaction without maintaining a power supply to the motor 176.

The stop member in the position of interaction thereof and the projecting part define a first angular stop position $\theta_B$ for the balance of the oscillating resonator which is different from the neutral position thereof, the projecting part abutting against the stop member in this first angular stop position when it arrives from the angular position '0' thereof, corresponding to the neutral position of the resonator, during second half-alternation of a first determined alternation from among the two alternations of each oscillation period of the resonator. Furthermore, the angle $\theta_B$ is provided such that it is less than a minimum amplitude of the oscillating mechanical resonator in the usable operating range thereof. Moreover, the angle $\theta_B$ is provided such that the oscillating resonator is halted by the stop member outside the coupling zone of the oscillating resonator with the escapement of the mechanical movement, which has been described hereinabove. The stop member in the position of interaction thereof and the projecting part further define a second angular stop position, close to the first but greater than the latter, for the balance of the oscillating resonator when the projecting part arrives from an extreme angular position of the resonator during a first half-alternation of the second alternation from among the two alternations of each oscillation period. This second angular stop position is also provided such that it is less than a minimum amplitude of the oscillating mechanical resonator in the usable operating range thereof.

It can be seen that the projecting part 190 can, in another alternative embodiment, axially extend from the felloe or from one of the arms of the balance, and the bistable electromechanical device 174 is thus arranged such that the bistable lever has a motion in a plane parallel to the rotational axis of the balance. In this other alternative embodiment, the respective magnetisation axes of the two magnets 182 and 186 are axial and remain substantially collinear, the magnet 182 thus being arranged beneath the head of the lever. It can be seen that such an arrangement of the bistable electromechanical device can also be provided within the scope of the alternative embodiment shown with a projecting part extending radially from the felloe. It should be noted that the projecting part of the resonator can, in another alternative embodiment, be arranged about the staff of the balance, in particular at the periphery of a plate borne by this staff or formed integrally in one piece with the staff. In an alternative embodiment, such a plate is the plate that bears the escapement pin.

Finally, the timepiece 170 comprises an electronic control unit 196 which is associated with the optical sensor 192 and arranged to control the power supply circuit 178 of the electromechanical device, to which the unit 196 provides the control signal $S4_{Cmd}$. The electronic control unit comprises a control logic circuit 198, an up-down counter 200 and a clock circuit 202. This control unit and the receiver 204 receiving the external correction signal $S_{Ext}$ are associated with the electromechanical device 174 to allow the second gain-correction mode to be implemented, in addition to the second mode for correcting a loss in the time displayed by the display of the timepiece, described herein below. 'Gain' and 'loss' in the displayed time are understood to mean both an error detected by an external device, comprising an application specific to the present invention, and a jump forward or backward in the displayed time which is required via an external correction signal $S_{Ext}$ supplied to the timepiece by an external device, whether it be for a seasonal time change as explained hereinabove or to carry out a change of time zone in the event that the user of the timepiece moves from one time zone to another.

To implement the second correction mode implemented in this sixth embodiment, the electronic control unit 196 is arranged to control the electromechanical device (also referred to as the 'actuator' or 'electromechanical actuator') such that it can selectively actuate the stop member (the bistable lever 184), depending on whether a loss or a gain in the time displayed by the timepiece is to be corrected, so that this stop member is displaced from the position of non-interaction thereof to the position of interaction thereof respectively before the projecting part 190 reaches said first angular stop position 8B during said second half-alternation of said first alternation of an oscillation period and before the projecting part 190 reaches said second angular stop position during said first half-alternation of said second alternation of an oscillation period.

In general, to at least partially correct a gain (positive time error), the electromechanical device is arranged such that, when the stop member is actuated to stop the mechanical resonator in a first half-alternation, the stop member momentarily prevents, after the projecting part has abutted against this stop member, the mechanical resonator from continuing the natural oscillatory motion specific to this first half-alternation, such that this natural oscillatory motion during the first half-alternation is momentarily interrupted before being continued, after a certain blocking time which ends by the withdrawal of the stop member. Preferably, the case of a bistable electromechanical device as described hereinabove provides for correcting substantially all of a positive time error, determined by an external correction signal provided to the timepiece according to the invention, during a continuous blocking period defining a correction period, which is substantially equal to the gain to be corrected. For this purpose, in the alternative embodiment described, after the moment at which the resonator passes through the neutral position thereof during a said second alternation of an oscillation period (alternation where the projecting part 190 reaches the head of the lever 184 before the passage of the resonator through the neutral position thereof), this second alternation being detected by the optical sensor 192 thanks to the arrangement intended to detect the direction of the oscillatory motion during the detection of the passages of the resonator through the neutral position thereof, the electronic control unit waits until a time of T0c/4 is reached to activate the actuator such that it drives, via the motor thereof, the lever 184 from the stable position of non-interaction thereof into the stable position of interaction thereof, where the head of the lever forms an abutment for the projecting part. Depending on the value of the angular stop position, which lies for example in the range 90° to 120°, a time of less than T0c/4 can be provided, for example T0c/5, to initiate a series of three electrical pulses allowing the motor 176 to be driven such that the rotor thereof rotates quickly by one and a half revolutions, the time interval for allowing the lever to pivot between the two stable positions thereof, by reversing the direction of the magnetic flux generated by the magnet 182, thus being extended. In the latter case, it must be ensured that the projecting part has indeed exceeded the angular stop position in the alternation preceding the first half-alternation during which the resonator is intended to be blocked during a correction period.

In general, to at least partially correct a loss (negative time error), the electromechanical device is arranged such that, when the stop member is actuated to stop the mechanical resonator in a second half-alternation of at least one said first alternation of an oscillation period (alternation during which the projecting part 190 reaches the head of the lever 184 after the passage of the resonator through the neutral position thereof), it thus prematurely ends this second half-alternation without blocking the resonator, but by reversing the direction of the oscillatory motion of this resonator, such that the mechanical resonator directly begins a subsequent alternation, after being instantaneously or near-instantaneously halted by the collision of the projecting part with the stop member. Thus, within the scope of the second loss-correction mode, the detector for detecting the position and direction of motion of the resonator and the electronic control unit are arranged such that they can activate the actuator, each time the external correction signal received by the receiver unit corresponds to a loss in the time displayed, such that this actuator actuates the stop member thereof so that the projecting part of the oscillating resonator comes to abut against this stop member in a plurality of half-alternations of the oscillation of the mechanical resonator each of which follow the passage thereof through the neutral position, so as to prematurely end each of these half-alternations without blocking the mechanical resonator. The number of half-alternations of said plurality of half-alternations is determined by the loss to be corrected.

Figure 17:
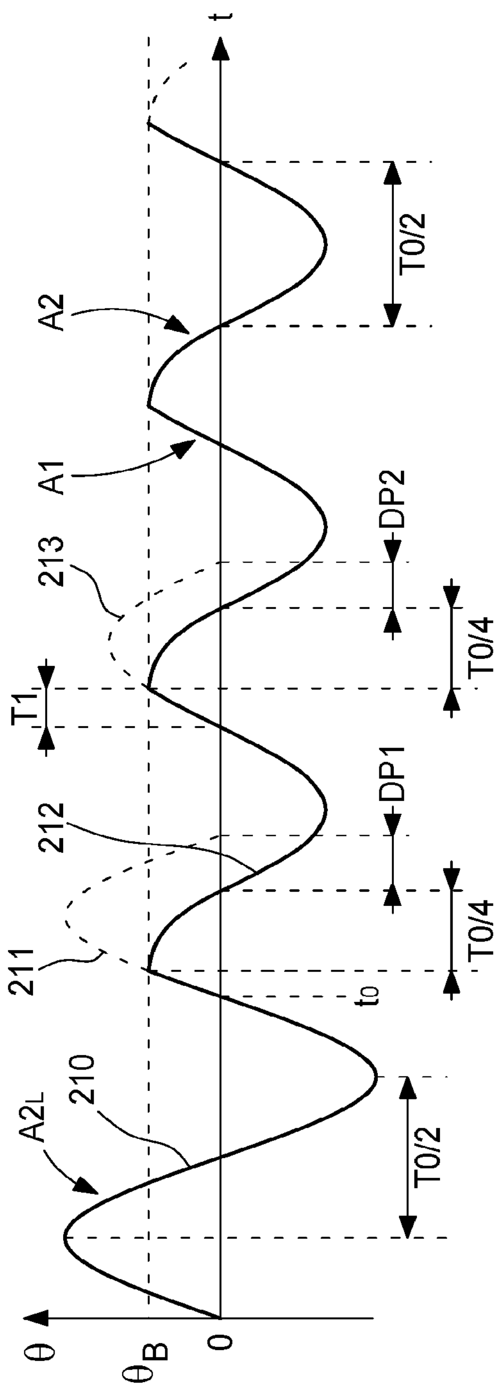
FIGS. 17 and 18 show the oscillation of the mechanical resonator during a loss-correction period respectively for two alternative embodiments of the braking device of the timepiece in FIG. 16.
Figure 18:
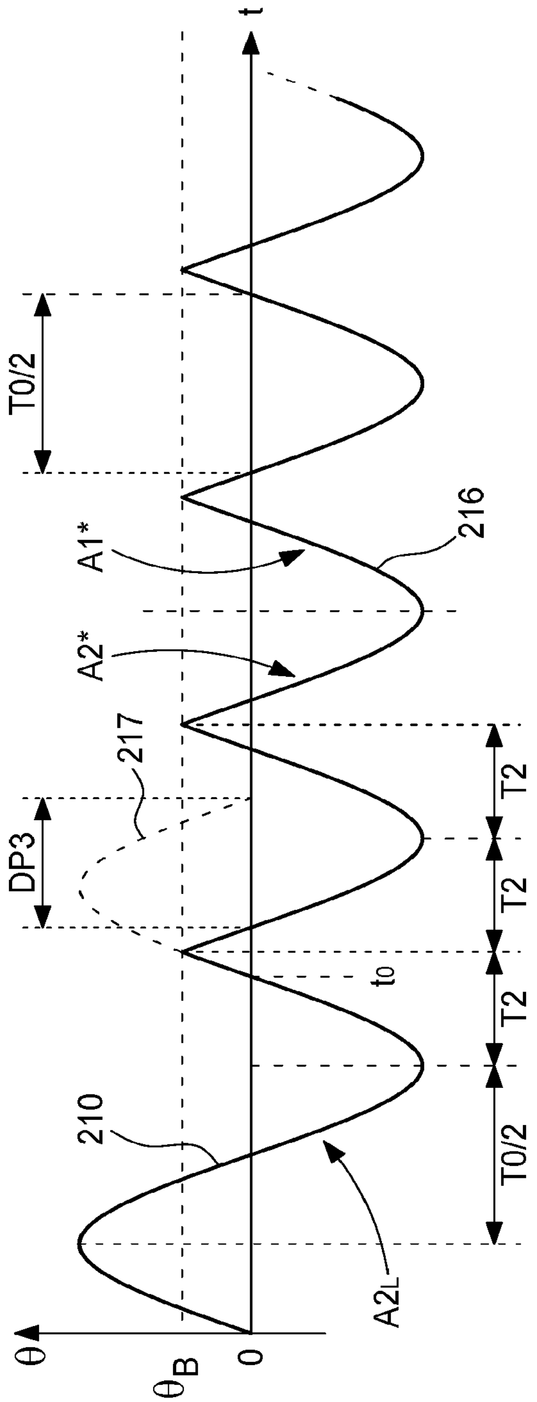

In a preferred alternative embodiment shown in FIGS. 17 and 18, the electronic control unit and the actuator are arranged such that, to at least partially correct a loss, the lever is maintained in the position of interaction thereof, after this lever is actuated from the position of non-interaction thereof to the position of interaction thereof when the oscillating resonator is located angularly on the neutral position side relative to the angular stop position, until the end of the correction period during which the projecting part of the oscillating mechanical resonator periodically abuts several times against the head of the lever, the duration of the correction period during which the lever is maintained in the position of interaction thereof being determined by the loss to be corrected. The pivoting of the lever from the position of non-interaction thereof to the position of interaction thereof can occur either in a said first alternation (that wherein the impact with the projecting part is intended to take place, this first alternation being detected by the detection of the direction of rotation of the balance) preferably directly after the detection of the passage through the neutral position so that the lever is placed in the position of interaction thereof before the projecting part reaches the stop angle 8B, or in a said second alternation (also detected by the detection of the direction of rotation of the balance) directly after the detection of the passage through the neutral position, this second alternative embodiment allowing more time to actuate the lever and allowing it to be placed in a stable manner in the position of interaction thereof (the stop angle is by definition less than or equal to 180°). For example, if $\theta_B$=120° and the amplitude of the free oscillation of the resonator $\theta_L$=270°, then in the second alternative embodiment, a time interval is procured corresponding to a rotation between the angle '0' and a little under 240° (360°−120°), i.e. about 230° if the angle $\theta_T$ to the rotational axis defined by the head of the lever is equal to about 10°, to carry out the pivoting of the lever (so as not to block the balance by exceeding the position of the projecting part in the second alternation); whereas in the first alternative embodiment, a time interval corresponding only to a rotation between the angle '0' and 120° is obtained. It can be seen that if $\theta_L<360°-\theta_B-\theta_T$, then much more time is available in the second alternative embodiment for the pivoting of the lever.

In general, in order to determine the duration of a loss-correction period, the electronic control unit comprises a measuring circuit associated with the optical sensor, this measuring circuit comprising a clock circuit, providing a clock signal at a given frequency, and a comparator circuit allowing a time drift of the oscillating resonator relative to the setpoint frequency thereof to be measured, the measuring circuit being arranged such that it can measure a time interval corresponding to a time drift of the mechanical resonator from the start of the correction period. The electronic control unit is arranged to end the correction period as soon as said time interval is equal to or slightly greater than a time error that is provided by the external correction signal.

In the alternative embodiment described in FIG. 16, the measuring circuit comprises a clock circuit 202, providing a periodic digital signal at the frequency F0c/2, and an up-down counter 200 (reversible counter). This up-down counter receives, at the '−' input thereof, the periodic signal of the clock circuit (causing this counter to decrement by two units for each setpoint period T0c=1/F0c) and at the '+' input thereof, a digital signal from the optical sensor 192 which comprises a pulse or a change in logic state upon each passage of the resonator 14A through the neutral position '0' thereof. Since such a passage occurs in each alternation of the oscillating resonator, the counter 200 is incremented by two units at each oscillation period. Thus, the state of the counter (integer $M_{Cb}$) is representative of a time drift of the mechanical resonator relative to the setpoint frequency which is determined by the clock circuit having the precision of a quartz oscillator. The integer $M_{Cb}$ corresponds to the number of additional alternations carried out by the resonator, from an initial moment when the reversible counter is reset, relative to a case of an oscillation at the setpoint frequency.

The control logic circuit 198 receives, from the optical sensor 192, a digital signal allowing this logic circuit to determine the passages of the resonator through the neutral position thereof and the direction of the oscillatory motion at each of these passages. In order to correct a given loss, after a passage of the resonator through the neutral position thereof is detected as described hereinabove, the control logic circuit on the one hand activates the actuator 174 so that it actuates the lever into the position of interaction thereof and, on the other hand, resets the clock circuit 202 and the up-down counter 200, which defines the start of a correction period. It should be noted that this reset can, in an alternative embodiment, take place before powering the actuator 174 to pivot the lever, but after the electronic control unit 196 and the optical sensor 192 have been activated. According to an alternative embodiment, the resetting of the clock circuit is not provided for. In other alternative embodiments, the optical sensor is replaced by another type of sensor, for example of the magnetic or capacitive type. In a specific alternative embodiment, the detector detecting the passage of the mechanical resonator through the neutral position thereof is formed by a miniaturised acoustic sensor (microphone of the MEMS type) capable of detecting the acoustic pulses generated by the impacts between the pin of the balance and the fork of the pallet-lever forming the escapement of the mechanical movement.

The number of alternations at the setpoint frequency F0c in a negative time error $T_{Err}$ (given loss) is equal to $-T_{Err}\cdot 2\cdot F0c$. Thus, as soon as the number $M_{Cb}$ of the up-down counter reaches this value or slightly exceeds same (since this value is not necessarily an integer), the given loss is made up and the time displayed is once again correct (it thus gives the actual time in a precise manner, in particular with a precision of one second). The control logic circuit is thus arranged such that it can compare the state of the counter with the value $-T_{Err}\cdot 2\cdot F0c$, and such that it can end the correction period as soon as it detects that the number $M_{Cb}$ is greater than or equal to this value, by controlling the power supply circuit 178 to the actuator so that the latter actuates the lever from the stable position of interaction thereof to the stable position of non-interaction thereof.

FIGS. 17 and 18 show the oscillations of the resonator 14A, respectively in the two specific extreme cases of the preferred alternative embodiment described hereinabove, at the start of a period for correcting a given loss. FIG. 17 concerns the case wherein the kinematic energy of the resonator is fully absorbed during each impact between the projecting part of the balance and the head of the abutment. The free oscillation 210 in particular has a second free alternation $A2_L$ before a detection of a time to upon the passage of the resonator through the neutral position thereof (position '0' of the projecting part 190) in the first following alternation, the time to marking the start of a period for correcting a given loss. The lever is displaced into the position of interaction thereof directly after the time to. After the first impact between the projecting part and the lever, a relatively large positive phase difference DP1 is obtained between the fictive free oscillation 211 and the oscillation 212. A stable phase is then established wherein the oscillation 212 is shortened, relative to a fictive free oscillation 213 from the preceding halting of the resonator by the stop member, in the second half-alternation of the first alternation A1 of each oscillation period, which thus results in a positive phase difference DP2 that is smaller than DP1. The second alternation A2 of the oscillation 212 is not disrupted by the lever.

FIG. 18 concerns a specific case of a heavy impact or elastic collision between the projecting part and the head of the lever. In this case, the kinetic energy of the resonator is retained during each impact, given that there is no dissipation of the kinetic energy during the impacts, only a reversion of the direction of the oscillatory motion. The amplitude of the oscillation 216 during the correction period thus remains identical to that of the free oscillation 210, and thus of the fictive free oscillation 217 for each oscillation period. After the time $t_0$, a stable phase is established with alternations A1* and A2* of a duration T2 which is far less than T0/2, generating a relatively high positive phase difference DP3 at each oscillation period. To obtain an elastic collision, the lever can be considered to have a certain elasticity, in particular the body of the lever and/or the head are formed by an elastic material capable of being subjected to a certain degree of compression, so as to momentarily absorb the kinetic energy of the balance and redistribute it immediately after the oscillatory motion is reversed. In such a case, the oscillation 216 will slightly exceed the stop angle $\theta_B$. In another more sophisticated alternative embodiment, it is the projecting part that is mounted elastically on the felloe of the balance. For example, the projecting part has a base forming a slide arranged in a circular slide-way machined in the felloe and an elastic element, in particular a small helical spring is arranged in the slide-way behind the slider, i.e. on the other side of the head of the lever relative to the projecting part when located in the angular position '0' thereof. In practice, the impacts between the projecting part of the balance and the abutment of the electromechanical device generally occur in a manner that corresponds to a physical situation between the two extreme situations described in FIGS. 17 and 18.

Finally, in another embodiment, the electromechanical device is formed by a monostable electromechanical actuator which comprises a moving finger arranged such that this moving finger can be alternately displaced between a first radial position and a second radial position when this actuator is respectively not activated (not powered) and activated (i.e. powered). The first radial position of the finger corresponds to a position of non-interaction with the balance of the oscillating resonator and the second radial position thereof corresponds to a position of interaction with the oscillating balance wherein this finger thus forms an abutment for the projecting part of the oscillating balance, in a similar manner to the head of the lever 184.

The invention claimed is:

1. A timepiece, comprising:

a display displaying an actual time;

a mechanical movement comprising a drive mechanism for driving the display and a mechanical resonator which is coupled to the drive mechanism such that an oscillation thereof times a running of the drive mechanism; and a device for correcting the actual time indicated by the display, wherein the device for correcting the actual time displayed comprises:

a receiver for receiving an external correction signal for correcting the actual time displayed, the external correction signal comprising information based upon a comparison of said actual time displayed from an image of the display captured by a photographic device and a time base comprised in an external device configured to supply a precise actual time;

an electronic controller configured to process said information contained in the external correction signal to determine a correction required for the actual time displayed; and a braking device for braking the mechanical resonator;

the electronic controller is configured to control the braking device as a function of the correction required, and the device for correcting the actual time is arranged such that, when the external correction signal received by the timepiece requires the actual time displayed to be corrected, the braking device is configured to act on the mechanical resonator during a correction period, to vary the running of the drive mechanism to carry out the required correction.

2. The timepiece according to claim 1, further comprising a device for determining a passage of the oscillating mechanical resonator through at least one specific position, the device for determining allowing said electronic controller to determine a specific moment at which the oscillating mechanical resonator is located in said specific position, wherein the electronic controller is arranged such that a first activation of the braking device, occurring at a start of the correction period to produce a first interaction between the braking device and the mechanical resonator, is initiated as a function of said specific moment.

3. The timepiece according to claim 2, wherein the mechanical movement comprises an escapement associated with the mechanical resonator, the braking device comprises an actuator provided with a stop member for stopping the oscillating mechanical resonator, the stop member is configured to be actuated between a position of non-interaction with the mechanical resonator and a position of interaction wherein the stop member forms an abutment for a projecting part of the oscillating mechanical resonator, the projecting part is arranged to abut against the stop member when the stop member is in the position of interaction thereof, the stop member in the position of interaction thereof and the projecting part defining a stop position for the oscillating mechanical resonator which is different from a neutral position thereof, corresponding to a minimum potential energy state of the mechanical resonator, and less than a minimum amplitude of the oscillating mechanical resonator in a usable operating range thereof, said stop position is further provided such that the oscillating mechanical resonator is brought to a halt by the stop member outside a coupling zone of the escapement with the oscillating mechanical resonator, and a circuit for determining said specific position of the oscillating mechanical resonator and the electronic controller are arranged to activate the actuator, when the external correction signal received by the receiver corresponds to a loss in a time displayed that is to be corrected, such that the actuator actuates the stop member thereof so that the projecting part of the oscillating mechanical resonator comes to abut against the stop member in a plurality of half-alternations of the oscillating mechanical resonator each of which follows the passage thereof through said neutral position, so as to prematurely end each of the half-alternations without blocking the mechanical resonator, a number of half-alternations of said plurality of half-alternations or a duration of the correction period during which the stop member is held in the position of interaction thereof being determined by said loss to be corrected.

4. The timepiece according to claim 3, wherein the device for determining said specific position of the oscillating mechanical resonator comprises a detector for detecting a position and direction of motion of the mechanical resonator, the detector and the mechanical resonator are arranged to allow the passage of the oscillating mechanical resonator through said specific position in each period of the oscillation thereof to be detected and to allow the electronic controller to determine the direction of motion of the oscillating mechanical resonator in the alternation during which the passage of the oscillating mechanical resonator through said specific position is detected, and the electronic controller is configured to at least partially correct said loss, such that the electronic controller is configured to control the actuator so that the actuator actuates the stop member thereof from the position of non-interaction thereof into the position of interaction thereof when the oscillating mechanical resonator is situated on the neutral position side relative to said stop position, and so that the actuator subsequently holds the stop member in the position of interaction for a determined duration that is sufficient for the projecting part of the oscillating mechanical resonator to abut at least once against the stop member.

5. The timepiece according to claim 4, wherein said actuator is of a bistable type and is arranged such that the actuator is configured to remain in the position of non-interaction and in the position of interaction without maintaining a power supply to the actuator, and the electronic controller and the actuator are arranged such that, to at least partially correct said loss, the stop member is maintained in the position of interaction thereof, after the stop member is actuated from the position of non-interaction thereof to the position of interaction thereof when the oscillating mechanical resonator is located on the neutral position side relative to said stop position, until the end of said correction period during which the projecting part of the oscillating mechanical resonator periodically abuts several times against the stop member.

6. The timepiece according to claim 4, wherein the electronic controller comprises a measuring circuit which is associated with said detector, the measuring circuit comprises a clock circuit, providing a clock signal at a determined frequency, and a comparator circuit allowing a time drift of the oscillating mechanical resonator relative to a setpoint frequency thereof to be measured, the measuring circuit is arranged to measure a time interval corresponding to a time drift of the mechanical resonator from the start of the correction period, and the electronic controller is arranged to end the correction period as soon as said time interval is greater than or equal to a time error that is supplied by the external correction signal.

7. The timepiece according to claim 1, wherein the braking device is formed by an electromechanical actuator, which is arranged to apply braking pulses to the mechanical resonator, the electronic controller comprises a device for generating at least one frequency which is arranged to generate a first periodic digital signal at a first frequency, the electronic controller is configured to provide the braking device, when the external correction signal received by the receiver corresponds to a displayed time loss that is to be corrected, with a first control signal derived from the first periodic digital signal, during a first correction period, to activate the braking device such that the braking device generates a first series of periodic braking pulses that are applied to the mechanical resonator at said first frequency, a duration of the first correction period and thus a number of periodic braking pulses in said first series being determined by said loss to be corrected, and the first frequency is provided and the braking device is arranged such that said first series of periodic braking pulses at the first frequency is configured to, during said first correction period, result in a first synchronous phase wherein the oscillation of the mechanical resonator is synchronised to a first correction frequency which is greater than a setpoint frequency provided for the mechanical resonator.

8. The timepiece according to claim 7, wherein said first frequency comprises one of at least two different frequency values as a function of said loss to be corrected, said device for generating at least one frequency is a frequency generator device which is arranged to generate said first periodic digital signal selectively at the two different frequency values, and the two different frequency values are provided such that said correction frequency includes two different correction frequency values, respectively for the two different frequency values, where a second correction frequency value is higher than a first correction frequency value, a first frequency value being selected when said loss is lower than a given value, whereas a second frequency value is selected when said loss is greater than or equal to the given value.

9. The timepiece according to claim 7, wherein said device for generating at least one frequency is a frequency generator device which is arranged to further generate a second periodic digital signal at a second frequency, the electronic controller is configured to provide the braking device, when the external correction signal received by the receiver corresponds to a displayed time gain that is to be corrected, with a second control signal derived from the second periodic digital signal, during a second correction period, to activate the braking device such that the braking device generates a second series of periodic braking pulses that are applied to the mechanical resonator at said second frequency, a duration of the second correction period and thus a number of periodic braking pulses in said second series being determined by said gain to be corrected, and the second frequency is provided and the braking device is arranged such that said second series of periodic braking pulses at the second frequency is configured to, during said second correction period, result in a second synchronous phase wherein the oscillation of the mechanical resonator is synchronised to a second correction frequency which is less than the setpoint frequency provided for the mechanical resonator.

10. The timepiece according to claim 9, wherein the mechanical movement comprises an escapement associated with the mechanical resonator, and said second frequency and a duration of the braking pulses of the second series of periodic braking pulses are selected such that, during said second synchronous phase, each of the braking pulses of said second series occurs outside a coupling zone of the oscillating mechanical resonator with the escapement.

11. The timepiece according to claim 7, wherein the mechanical movement comprises an escapement associated with the mechanical resonator, and said first frequency and a duration of the braking pulses of the first series of periodic braking pulses are selected such that, during said first synchronous phase, each of the braking pulses of said first series occurs outside a coupling zone of the oscillating mechanical resonator with the escapement.

12. The timepiece according to claim 7, wherein the device for generating at least one frequency is a frequency generator device which is arranged to further generate a third periodic digital signal at the setpoint frequency for the mechanical resonator, the electronic controller is configured to provide the braking device with a third control signal derived from the third periodic digital signal, during a preliminary period preceding the correction period, to activate the braking device such that the braking device generates a preliminary series of periodic braking pulses which are applied to the mechanical resonator at the setpoint frequency, a duration of the braking pulses and the braking force applied to the oscillating mechanical resonator during the preliminary series of periodic braking pulses being provided such that none of the braking pulses is configured to bring the oscillating mechanical resonator to a halt inside a coupling zone of the oscillating mechanical resonator with an escapement, the electronic controller is arranged such that a duration of the preliminary period and the braking force applied to the oscillating mechanical resonator during the preliminary series of periodic braking pulses allow, at least at an end of the preliminary period, a preliminary synchronous phase to be produced, wherein the oscillation of the mechanical resonator is synchronised to the setpoint frequency, and the electronic controller is arranged such that an initiation of a first braking pulse of the first series of periodic braking pulses, during said correction period, occurs after a time interval determined relative to a moment at which the last braking pulse of the preliminary period was initiated, the moment at which said first braking pulse is initiated and the braking force applied to the oscillating mechanical resonator during said first series of periodic braking pulses being provided such that said first synchronous phase at said correction frequency starts instantly at said first braking pulse or a second braking pulse.

13. The timepiece according to claim 1, further comprising a device for blocking the mechanical resonator, wherein the electronic controller is configured to provide the blocking device, when the external correction signal received by the receiver corresponds to a displayed time gain that is to be corrected, with a fourth control signal which activates the blocking device such that the blocking device blocks said oscillation of the mechanical resonator during said correction period which is determined by said gain to be corrected, in order to stop the running of said drive mechanism during the correction period.

14. The timepiece according to claim 13, wherein said correction period has a duration that is substantially equal to said gain to be corrected.

15. The timepiece according to claim 13, wherein the blocking device is formed by a device that is separate from said braking device and comprises a bistable lever, a first stable position of the bistable lever corresponding to a position of non-interaction with the mechanical resonator and a second stable position thereof corresponding to a position for halting and blocking the mechanical resonator.

16. The timepiece according to claim 13, wherein the blocking device forms a lock for the mechanical resonator, a part of the blocking device being inserted into a cavity, arranged in a circular element of a balance forming the mechanical resonator, when the blocking device is activated to block the mechanical resonator during the period for correcting a given gain.

17. The timepiece according to claim 1, wherein, said correction of the displayed time is relative to a time error detected in the displayed time by the external device configured to supply said external correction signal to the timepiece.

18. The timepiece according to claim 1, wherein said correction of the displayed time is relative to a time zone change or to a seasonal time change.

19. The timepiece according to claim 18, further comprising a measuring circuit, formed by a programmable counter and a clock circuit, for measuring a remaining time interval between a receipt of an external correction signal relative to the seasonal time change, a scheduled date, and time for making the seasonal time change.

20. An assembly formed by the timepiece according to claim 1 and by the external device comprising a transmitter for transmitting said external correction signal, wherein the external device comprises:

the photographic device comprising a photographic sensor formed by an array of photodetectors;

an image processing algorithm which is configured to determine a position of at least one determined hand of said display of the timepiece in the image captured by the photographic device; and the time base configured to supply the precise actual time.

21. The assembly according to claim 20, wherein the external device further comprises an algorithm for calculating a time error between a first time datum, indicated by the display at a given moment in time and detected by the external device via the photographic sensor thereof and the image processing algorithm thereof, and a second time datum corresponding to the first time datum and supplied substantially at said given moment in time by said time base, and when correcting determined time error, the external correction signal supplied by the device external to the timepiece comprises information relating to the time error.

22. The assembly according to claim 20, wherein the external device is a mobile phone.

23. The assembly according to claim 20, wherein the external device is incorporated into a box provided for the timepiece and comprising a recess for receiving the timepiece in a given position.

* * * * *